(12) United States Patent
Chow et al.

(10) Patent No.: US 11,671,856 B2
(45) Date of Patent: Jun. 6, 2023

(54) SYSTEM AND METHOD FOR EVALUATING WIRELESS DEVICE AND/OR WIRELESS NETWORK PERFORMANCE

(71) Applicant: Tutela Technologies Ltd., Victoria (CA)

(72) Inventors: Brennen Stephen Chow, Port Coquitlam (CA); Hunter Banford Bulmer MacDonald, Keswick Ridge (CA); David Daniel Yarish, Victoria (CA); Anthony Sean Kroeker, Victoria (CA); Stephen William Neville, Victoria (CA); Thomas E. Darcie, Victoria (CA)

(73) Assignee: Tutela Technologies Ltd., Victoria (CA)

(*) Notice: Subject to any disclaimer, the term of this patent is extended or adjusted under 35 U.S.C. 154(b) by 189 days.

(21) Appl. No.: 16/950,143

(22) Filed: Nov. 17, 2020

(65) Prior Publication Data

US 2021/0076237 A1 Mar. 11, 2021

Related U.S. Application Data

(63) Continuation of application No. 16/948,251, filed on Sep. 10, 2020, which is a continuation of application
(Continued)

(51) Int. Cl.
*H04W 24/08* (2009.01)
*H04L 43/50* (2022.01)
(Continued)

(52) U.S. Cl.
CPC ......... *H04W 24/08* (2013.01); *H04L 43/0876* (2013.01); *H04L 43/0888* (2013.01);
(Continued)

(58) Field of Classification Search
CPC .. H04W 24/08; H04W 64/00; H04L 43/0876; H04L 43/0888; H04L 43/50;
(Continued)

(56) References Cited

U.S. PATENT DOCUMENTS 6,618,360 B1    9/2003  Scoville
8,355,945 B1 *  1/2013  Lall ..................... G06Q 10/00
                                                  705/7.29
(Continued)

FOREIGN PATENT DOCUMENTS

CA      2644528 A1    9/2007
CA      2420238 C     5/2011
(Continued)

OTHER PUBLICATIONS

International Search Report issued in related PCT application No. PCT/CA2018/050043; search completed Apr. 13, 2018.
(Continued)

*Primary Examiner* — Ayanah S George
(74) *Attorney, Agent, or Firm* — CPST Intellectual Property Inc.; Brett J. Slaney

(57) ABSTRACT

There is provided a method of evaluating user churn in wireless networks. The method includes receiving data from a plurality of wireless electronic devices connected to and operating in a plurality wireless networks and/or network types, wherein the data has been collected for each wireless electronic device by wireless device software embedded in an application or memory of the respective wireless electronic device and configured to collect the data when the wireless electronic device accesses one or more of the plurality of wireless networks and/or network types, and wherein the data comprises one or more identifiers associated with the wireless electronic device or a user of the wireless electronic device. The method also includes aggre-
(Continued)

gating the data received from the plurality of wireless electronic devices; analyzing the aggregated data to determine how at least one of the identifiers flows through the plurality of networks, devices, and/or network types; and outputting a prediction or indication of user network churn or user device churn based on which networks, devices, and/or network types the user or wireless electronic device accesses.

21 Claims, 11 Drawing Sheets

Related U.S. Application Data

No. 15/872,264, filed on Jan. 16, 2018, now Pat. No. 10,827,371.

(60) Provisional application No. 62/447,255, filed on Jan. 17, 2017.

(51) Int. Cl.
*H04L 43/0888* (2022.01)
*H04L 43/0876* (2022.01)
*H04L 43/08* (2022.01)
*H04L 41/5009* (2022.01)
*H04W 64/00* (2009.01)

(52) U.S. Cl.
CPC .......... *H04L 43/50* (2013.01); *H04L 41/5009* (2013.01); *H04L 43/08* (2013.01); *H04W 64/00* (2013.01)

(58) Field of Classification Search
CPC ..... H04L 41/5009; H04L 43/08; H04L 43/20; H04L 41/40
See application file for complete search history.

(56) References Cited

U.S. PATENT DOCUMENTS

| | | |
|---|---|---|
| 9,274,935 B1 | 3/2016 | Lachwani et al. |
| 9,430,364 B1 | 8/2016 | Ryan et al. |
| 9,444,692 B2 | 9/2016 | Lehane et al. |
| 9,451,451 B2 | 9/2016 | Chow et al. |
| 9,465,668 B1 | 10/2016 | Roskind |
| 9,530,168 B2 | 12/2016 | Ahn et al. |
| 2003/0231741 A1 | 12/2003 | Rancu |
| 2005/0049991 A1 | 3/2005 | Aggarawal |
| 2006/0153087 A1 | 7/2006 | Kang |
| 2006/0224730 A1 | 10/2006 | Fok et al. |
| 2008/0239972 A1 | 10/2008 | Omar |
| 2008/0274716 A1 | 11/2008 | Fok |
| 2011/0279228 A1 | 11/2011 | Kumar |
| 2012/0123723 A1 | 5/2012 | El-Hassan |
| 2013/0159150 A1 | 6/2013 | Hao |
| 2014/0372213 A1* | 12/2014 | Gipson .................. G06Q 50/01 705/14.53 |
| 2015/0371163 A1 | 12/2015 | Noh et al. |
| 2016/0011623 A1 | 1/2016 | Therien |
| 2016/0014625 A1 | 1/2016 | Devarasetty |
| 2016/0100325 A1 | 4/2016 | Hain |
| 2016/0134498 A1 | 5/2016 | Maness et al. |
| 2016/0255482 A1 | 9/2016 | Brown et al. |
| 2016/0373944 A1 | 12/2016 | Jain |
| 2017/0171770 A1 | 6/2017 | Wennesheimer et al. |
| 2017/0220933 A1 | 8/2017 | Gonguet et al. |

FOREIGN PATENT DOCUMENTS

| | | |
|---|---|---|
| CA | 2800482 A1 | 12/2011 |
| CA | 2662415 C | 9/2012 |
| CN | 101674596 A | 3/2010 |
| CN | 101675679 A | 3/2010 |
| CN | 101680914 A | 3/2010 |
| CN | 103385017 A | 11/2013 |
| CN | 104469834 A | 3/2015 |
| EP | 2733614 A2 | 5/2014 |
| WO | 2008042813 A2 | 4/2008 |
| WO | 20100019452 A1 | 2/2010 |
| WO | 2011139639 A1 | 11/2011 |
| WO | 2014165631 A1 | 10/2014 |

OTHER PUBLICATIONS

Supplemental European Search Report (SESR) issued in related EP application No. EP18741373; search completed Sep. 11, 2020.
Office Action (1) issued in Chinese Patent Application No. 201880014462.5 dated Jun. 21, 2022.
Office Action (2) issued in Chinese Patent Application No. 201880014462.5 dated Oct. 18, 2022.
U.S. Appl. No. 16/948,251, filed Sep. 10, 2020.
U.S. Appl. No. 15/872,264, filed Jan. 16, 2018.

* cited by examiner

SYSTEM AND METHOD FOR EVALUATING WIRELESS DEVICE AND/OR WIRELESS NETWORK PERFORMANCE

CROSS-REFERENCE TO RELATED APPLICATION(S)

This application is a continuation of U.S. patent application Ser. No. 16/948,251 filed on Sep. 10, 2020, which is a continuation of U.S. patent application Ser. No. 15/872,264 filed on Jan. 16, 2018 (now U.S. Pat. No. 10,827,371), and claims priority to U.S. Provisional Patent Application No. 62/447,255 filed on Jan. 17, 2017, the contents of which are incorporated herein by reference.

TECHNICAL FIELD

The following relates to systems and methods for evaluating wireless device and/or wireless network performance, and wireless network usage trends.

DESCRIPTION OF THE RELATED ART

The number of wireless devices that are accessing wireless communication networks is continually growing. These devices may access the various networks via cellular, WiFi and other access points. As the number of devices grows, the strain on these networks grows, affecting the performance of both the networks and the devices.

In order to address the performance of wireless devices and wireless networks, network service providers, device manufacturers, application developers and other entities that have a stake in affecting such performance require performance and usage data. Various techniques exist for collecting and evaluating performance and usage data, for example, standalone on-device applications or modules that perform periodic testing. Wireless carriers may also have native applications that have access to certain performance data that can be evaluated.

However, these techniques can be either intrusive to the devices and users of those devices, be limited to the type of network and/or type of device and/or type of user onto which the applications or modules are deployed, or be rigid in when and how the techniques are implemented.

SUMMARY

The following provides a system and method that embeds or otherwise deploys a software functionality onto wireless electronic devices (e.g., embedded into applications, memory, an operating system (OS), or elsewhere) to collect data regarding the usage and performance of the device, applications, OS, network, etc. In order to balance the competing objectives of interacting with the devices in order to collect the data and having a minimal effect on the applications and operations of the device, the software functionality is integrated in a flexible and transparent manner.

By deploying this software functionality in a multitude of devices on a multitude of networks, large and meaningful data sets across different apps, devices, networks, etc. can be gathered without having an adverse impact on the operability of the devices in the normal course of their usage.

In one aspect, there is provided a computer-implemented method of evaluating user churn in wireless networks, the method comprising: receiving data from a plurality of wireless electronic devices connected to and operating in a plurality wireless networks and/or network types, wherein the data has been collected for each wireless electronic device by wireless device software embedded in an application or memory of the respective wireless electronic device and configured to collect the data when the wireless electronic device accesses one or more of the plurality of wireless networks and/or network types, and wherein the data comprises one or more identifiers associated with the wireless electronic device or a user of the wireless electronic device; aggregating the data received from the plurality of wireless electronic devices; analyzing the aggregated data to determine how at least one of the identifiers flows through the plurality of networks, devices, and/or network types; and outputting a prediction or indication of user network churn or user device churn based on which networks, devices, and/or network types the user or wireless electronic device accesses.

In another aspect, there is provided a system for evaluating user churn in wireless networks, the system comprising a processor and memory, the memory computer executable instructions that when executed by the processor operate the system to: receive data from a plurality of wireless electronic devices connected to and operating in a plurality wireless networks and/or network types, wherein the data has been collected for each wireless electronic device by wireless device software embedded in an application or memory of the respective wireless electronic device and configured to collect the data when the wireless electronic device accesses one or more of the plurality of wireless networks and/or network types, and wherein the data comprises one or more identifiers associated with the wireless electronic device or a user of the wireless electronic device; aggregate the data received from the plurality of wireless electronic devices; analyze the aggregated data to determine how at least one of the identifiers flows through the plurality of networks, devices, and/or network types; and output a prediction or indication of user network churn or user device churn based on which networks, devices, and/or network types the user or wireless electronic device accesses.

In yet another aspect, there is provided a non-transitory computer readable medium comprising computer executable instructions for evaluating user churn in wireless networks, comprising instructions for: receiving data from a plurality of wireless electronic devices connected to and operating in a plurality wireless networks and/or network types, wherein the data has been collected for each wireless electronic device by wireless device software embedded in an application or memory of the respective wireless electronic device and configured to collect the data when the wireless electronic device accesses one or more of the plurality of wireless networks and/or network types, and wherein the data comprises one or more identifiers associated with the wireless electronic device or a user of the wireless electronic device; aggregating the data received from the plurality of wireless electronic devices; analyzing the aggregated data to determine how at least one of the identifiers flows through the plurality of networks, devices, and/or network types; and outputting a prediction or indication of user network churn or user device churn based on which networks, devices, and/or network types the user or wireless electronic device accesses.

BRIEF DESCRIPTION OF THE DRAWINGS

Embodiments will now be described by way of example with reference to the appended drawings wherein.

DETAILED DESCRIPTION

Figure 1:
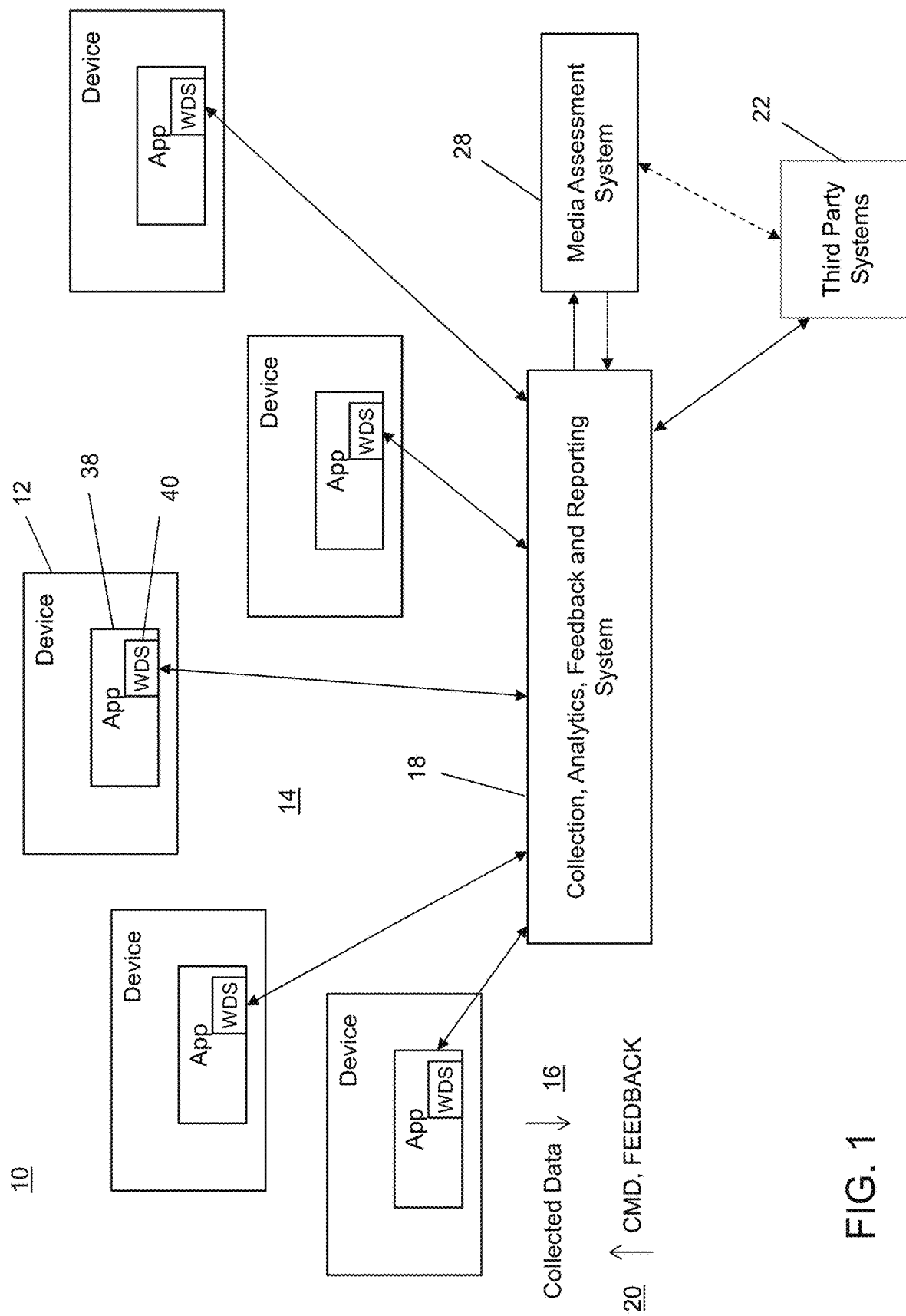
FIG. 1 is a schematic block diagram of a wireless communication environment that includes a number of electronic communication devices.

The following provides a system that enables crowd-sourced data from a multitude of devices across a multitude of applications, networks, and environments to be gathered and analyzed in a way that allows more meaningful and complete data to be obtained without overly impacting the devices and networks within which the system operates in an adverse manner.

As will be described herein having a minimal impact on the applications and processes running on the devices into which the software functionality is deployed should consider various factors.

For example, the software functionality should not use too much battery power, CPU processing power, network bandwidth, or memory. Data collection rates should also be tunable such that they can be reduced to accommodate user actions, network intensive actions, and according to device battery level, the device's location, and in-app activities. In order to deploy the software functionality more widely to obtain a wider data set, the software functionality relies on the integration with apps, games, operating systems, tools/utilities, etc., that are widely distributed and used. As such, the software functionality should not interfere with the performance of, e.g., advertisements that provide revenue to an app/game partner. For example, the software functionality should not perform a throughput test at the same time as an advertisement is being loaded over the network.

The software functionality described herein is also configured to be responsive to a configuration server that sets rules around when and where tests should be performed, what tests should be performed, and in what quantity. This enables the software functionality to be "tuned" to accommodate different networks/locations, different apps/games, different users, etc. For example, the software functionality should wait until the device connects to WiFi before uploading the collected data logs to the server/system so as to minimize the impact on a user's data plan (and/or set limits on a monthly usage for any testing done on a particular device or account). In this way, the software functionality can safeguard against adversaries wishing to use the present system to impact devices and apps.

As will be described herein, the software functionality can perform active tests that generate network traffic to measure network performance. This may involve pinging a test server to test network latency, or download a file of a predetermined size from such a server to determine download speeds and throughput. Passive tests are also performed in which the software functionality generates no additional traffic but instead monitors existing traffic generated by the user, the applications, the network infrastructure, etc. For example the software functionality can monitor the speed at which an advertisement is downloaded and the size of that advertisement to estimate speed and throughput. The software functionality can also be configured to be embedded within or have an interface between the application and the OS in order to access information that is already being tracked or is otherwise available via the OS. With these different techniques, the software functionality can adapt and tune its operations in order to gather meaningful and complete data for the system, while taking into account device, application, and network performance.

Turning now to the figures, FIG. 1 illustrates an example of a wireless environment 10 which can include one or more wireless networks 14. The networks 14 can be of different types, e.g., different cellular network types (2G, 3G, 4G, etc.). The different network types can also include other types of wireless networks 14 such as WiFi networks accessible through available WiFi access points. Within the wireless network environment 10 various electronic communication devices 12 having wireless capabilities operate by connecting to one or more of the different networks/network types 14 and/or directly with each other over peer-to-peer or mesh-type connections.

In order to obtain crowdsourced data 16 from the environment 10, each of the devices 12 includes a software functionality that is capable of performing tests, monitoring existing device operations and usage, and otherwise collecting data on or related to one or more applications on that device 12. This software functionality is referred to herein as wireless device software (WDS) 40, and in the example shown in FIG. 1, the WDS 40 is embedded in at least one app 38 on the devices 12. However, as will be illustrated below, the WDS 40 can be deployed on the devices 12 in different configurations than that shown in FIG. 1. By partnering with publishers of various mobile apps (e.g., games) or operating systems or tools/utilities, the WDS 40 can be distributed to millions of mobile devices 12 to anonymously collect QoS, network usage trends, device and app usage data, among other things. It can be appreciated that the WDS 40 can also be integrated with carrier apps or other purpose-built apps to be used on a number of mobile devices 12. The WDS 40 can be embedded in apps and games running on various mobile platforms/OS such as Android, iOS, Windows, etc.; as well as other mobile platforms such as those used for wearables, gaming, vehicle systems, wireless sensors, etc. That is, any other device/platform with location-tracking capabilities (e.g., GPS, network based location, etc.) and network (e.g., Internet) connectivity with an ability to run the software functionality described herein are applicable to the data collection, analysis, and feedback/reporting mechanisms described herein. In some implementations, devices with only network connectivity and without location-based capabilities may also be incorporated into the system.

The data 16 that is collected is preferably tied to a location or otherwise considered "location-based" such that the data 16 or information derived from the data 16 can be placed on a map. The data 16 is also preferably collected in an anonymous manner such that no personally identifiable information is collected and/or stored by the system 18. For example, the system 18 should be configured to not collect a device's advertiser ID, device ID, or other information that could be used in conjunction with another dataset to identify the user of the device 12. In one implementation, the software functionality described herein can be configured to generate and append a unique random number which is specific to the particular installation, and which is reset (e.g. regenerated) periodically (e.g., each day). This can be done to ensure that an adversary cannot observe data reported from one device over the course of several days to determine who that device may belong to.

The data 16 can include, without limitation: device location, device manufacturer name, device model, OS name and version, network operator ID, % memory free, CPU utilization, battery drain rate, storage utilization (i.e. device metrics), application name, download bytes, upload bytes, first install time, last updated time (i.e. mobile application metrics), upload throughput, download throughput, latency, link speed, signal strength, jitter, packet discard rate, packet loss, # of radio frequency conflicts (i.e. network QoS metrics), BSSID, SSID, signal strength (i.e. Wi-Fi scan metrics), connection start/end times, connection type, technology, service provider, cell ID, LAC, MCC, MNC, DHCP response time (i.e. connection metrics), etc.

The collected data 16 is fed to a central system 18 that includes modules and processes for collecting the data 16, processing and analyzing the data 16, generating feedback for the WDS 40 and devices 12, and preparing user interfaces and reports therefore. It can be appreciated that multiple "central" systems 18 can be used, e.g., to comply with handling laws requiring that data from a particular jurisdiction be stored in that jurisdiction, etc. The data 16 can be securely stored in cloud-based databases and securely transmitted via secure connections (e.g., HTTPS). The databases can be globally dispersed and can be configured to provide direct access to the clients of the system 18.

The reports and user interfaces are generated and made available to one or more third parties 22, in particular to game or app developers, device manufacturers, network operators, etc. The reports and user interfaces can be provided using data visualization tools such as graphical reports, interactive dashboards, web tools, etc. Reports can be delivered on a periodic basis or in real time with dashboards being available when needed online at any time.

Other third parties 22 such as self-organizing networks (SONs) can also benefit from the data 16 that is crowdsourced by the system 18. SONs dynamically adjust the network, antennae, or wave forming characteristics in response to network quality. The idea is that the network is self-healing such that if there is an issue, the network will adjust to eliminate the issue all on its own. SONs typically require access to large amounts of field data to operate, which can be satisfied with the large datasets that can be obtained using the system 18. The system 18 and optionally the third parties 22 can also communicate with a media assessment system 28 which, as explained below, is an example of an purpose-specific data collection system that utilizes a customized version of the WDS 40.

As will be explained in greater detail below, the system 18 can have or otherwise control or operate with a configuration server that generally represents any entity or service that can be controlled by or through the system 18 for interacting with the WDS 40 deployed on the devices 12. In this way, the behaviour of the WDS 40 or the effects on and/or behaviour of the applications 38 can be modified by the system 18 or even the third parties 22 directly, if registered or otherwise permitted to by the system 18. This allows commands or feedback 20 to be provided by the system 18 to the WDS 40 in each and every device 12 if desired. In one example, the configuration server can be used to provide a "kill switch" or other functionality that can instruct the WDS 40 and/or the application 38 itself to terminate or halt operations, e.g., in the case of a security breach or to avoid a potential app or server failure. It can be appreciated that the kill switch module 126 can also be integrated into the configuration server 124 and/or the app 38 or WDS 40.

Figure 2A:
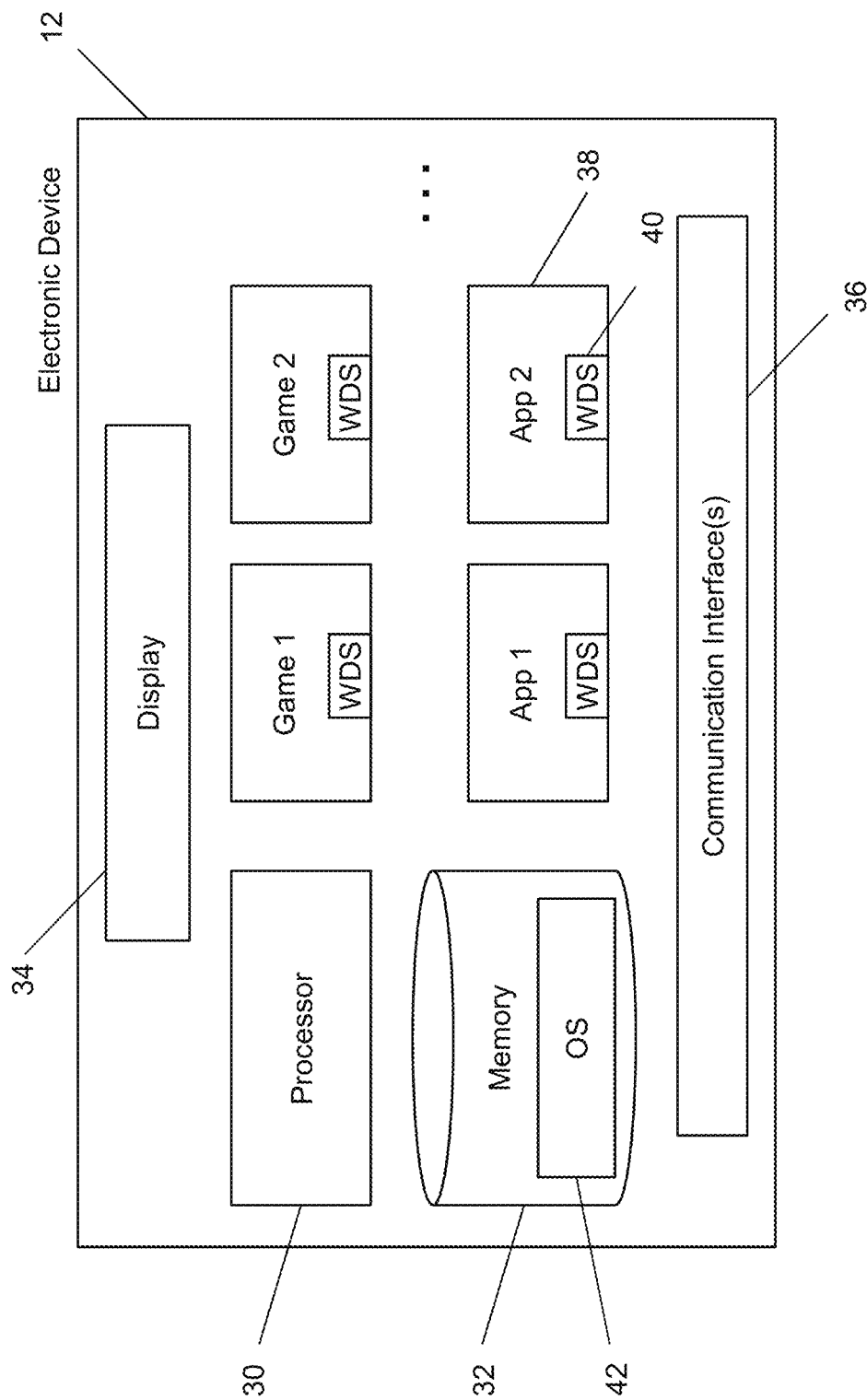
FIG. 2A is a block diagram of a configuration for a wireless device.

Turning now to FIG. 2A, an example of a configuration for an electronic device 12 is shown having at least one instance of the WDS 40. The device 12 includes a processor 30, memory 32, and an operating system 42. The device 12 is also operable in this example to provide graphical user interfaces to a user via a display 34. For example, a visual component can be provided directly on the device 12 for displaying a portion of the information collected to the user, if desired by the user. The device 12 also includes one or more communication interfaces 36 that are operable to connect the device 12 to one or more networks 14. As also shown in FIG. 2A, the device 12 can include multiple apps 38, of different types as discussed above. In order to collect and send data 16 which is relevant across multiple apps 38 and app types, each app 38 (or any one or more apps 38) may embed the aforementioned WDS 40 (that is embedded in, and runs in the background of the app 38) to gather particular data, perform tests, etc. The WDS 40 is capable of not only accessing components on the device 12 such as the processor 30, battery (not shown in FIG. 2A) and OS 42, the WDS 40 can be configured to either directly, or via the app 38 on which it resides, communicate on one or more networks 14 by interfacing with the one or more communication interfaces 36. It can be appreciated that the WDS 40 can have a hardcoded limit of a number of tests that can be performed over a time period, which limits are unalterable by the configuration server. The WDS 40 can also be operable to identify its own code running in a different application on a same electronic device, and be responsive to identifying its own code running in the different application by having only one instance of the wireless device software operating at the same time.

The WDS 40 can be implemented as a software library that is embedded in mobile device applications as shown in FIG. 2A, and designed to report and integrate with the system 18 as exemplified below. The WDS 40 is a mobile library configured for one or more OS types, e.g., iOS, Android, Windows, BlackBerry, etc. The library is configured to be readily added to an existing application to collect device, connection, network QoS, Wi-Fi, and application key performance indicators (KPIs). Using such an over the top approach requires that the WDS 40 have the ability to communicate with the system 18 over a network connection, either on Wi-Fi or mobile (e.g., cellular). This allows for the flexibility of deploying through a cloud infrastructure anywhere around the world. The WDS 40 interacts with various sets of servers during its operation, details of which are provided below, namely: an authentication server, configuration server, test servers, and reporting servers. The licensing server dictates which API keys and apps are allowed to operate and collect data through the WDS 40. The configuration server sets the specific rules and parameters for the operation of the WDS 40. The WDS 40 can use the test servers to perform active tests on the connected network. The WDS 40 can have intelligence built in, which is responsive to the configuration server, which determines which test server to interact with for active tests. There are many servers globally that could use for these tests and system should dynamically choose the right one for the WDS 40 each time. For example, the system may choose to always test against the geographically closest test server.

The reporting servers are used to upload the data payloads from the WDS 40 and into the system for subsequent analyses, reporting, feedback, etc.

It can be appreciated that preferably no personally identifiable information is recorded or transmitted, including no key press information, no contact information, etc.

The following, non-exhaustive list of KPIs can be collected by the WDS 40 and stored locally in a database (e.g., SQLite):

For network QoS→Device Manufacturer Name, Device Model, OS Name & Version, Device Screen Resolution Width, Device Screen Resolution Height, Total Device Memory, Total Device Disk Storage, Language, Connection Type, Mobile Technology, Service Provider, Start Connection Timestamp, End Connection Timestamp, Cell ID, location area code (LAC), basic service set identification (BSSID), service set identifier (SSID), mobile country code (MCC), mobile network code (MNC), Timezone, physical cell ID (PCI), QoS Collection Timestamp, Upload Throughput, Download Throughput, Latency, Link Speed, Signal Strength, Latitude, Longitude, Altitude, Horizontal Accuracy, Vertical Accuracy, Jitter, Packet Loss, Speed, Bearing, Device Free Memory, Device CPU, Device Battery Level, Device Battery State, Device Free Storage, Delta Transmitted Bytes, Delta Received Bytes, reference signal received power (RSRP), reference signal received quality (RSRQ), reference signal signal-to-noise ratio (RSSNR), channel quality indicator (CQI), timing advance (TA), System Uptime, Country, Region, City, Geohash, etc.

For application data usage→Device Manufacturer Name, Device Model, OS Name & Version, Device Screen Resolution Width, Device Screen Resolution Height, Total Device Memory, Total Device Disk Storage, Language, Connection Type, Mobile Technology, Service Provider, Start Connection Timestamp, End Connection Timestamp, Cell ID, LAC, BSSID, SSID, MCC, MNC, Timezone, PCI, App Name, App Package Name, App Delta Transmitted Bytes, App Delta Received Bytes, App Delta Application Uptime, App First Install Time, App Last Update Time, Country, Region, City, Average Latitude, Average Longitude, Geohash, etc.

For WDS database→Primary Key (device), Identifier, Device Manufacturer Name, Device Model, OS Name & Version, Device Screen Resolution Width, Device Screen Resolution Height, Total Device Memory, Total Device Disk Storage, Language, WDS Version, Database Version, Upload Time, Created Date Time, Host App Package Name, Host App Version, Connection ID (connection), Connection Type, Mobile Technology, Service Provider, Start Connection Timestamp, End Connection Timestamp, Cell ID, LAC, BSSID (connection), SSID (connection), Response Time, Authentication Time, MCC, MNC, Timezone, PCI, Primary Key (QoS), Connection ID (QoS), QoS Collection Timestamp, Upload Throughput, Download Throughput, Average Latency, Maximum Latency, Minimum Latency, Link Speed, Signal Strength, Latitude, Longitude, Altitude, Horizontal Accuracy, Vertical Accuracy, Average Jitter, Maximum Jitter, Minimum Jitter, Server Response Sent Packets, Server Response Discarded Packets, Server Response Discarded Percentage, Transmitted Bytes, Transmitted Packets, Received Bytes, Received Packets, Server Response Sent Packets, Server Response Lost Packets, Server Response Lost Percentage, Speed, Bearing, Device Free Memory, Device CPU, Device Battery Level, Device Battery State, Device Free Storage, Delta Transmitted Bytes, Delta Received Bytes, RSRP, RSRQ, RSSNR, CQI, TA, System Uptime, Download Throughput Test Size, Upload Throughput Test Size, QoS Test Trigger, Download Throughput Test Server DNS, Download Throughput Test Server IP, Upload Throughput Test Server DNS, Upload Throughput Test Server IP, Server Response Test Server DNS, Server Response Test Server IP, Primary Key, Wi-Fi Scan Timestamp, BSSID (WiFi scan), SSID (WiFi scan), Signal Strength, Frequency, Latitude (WiFi scan), Longitude (WiFi scan), Altitude (WiFi scan), Horizontal Accuracy (WiFi scan), Vertical Accuracy (WiFi scan), Access Point Capabilities, Primary Key (WiFi scan), Connection ID (WiFi scan), ADU Timestamp, Application Name, Application Package Name, Delta Application Transmitted Bytes, Delta Application Received Bytes, Application Transmitted Bytes, Application Received Bytes, Delta Application Uptime, Application Uptime, Application First Install Time, Application Last Update Time, etc.

For configuration server parameters (DSC=dynamic server configuration)→The DSC configuration UNIX timestamp, The DSC configuration version, The DSC JSON schema version, The frequency at which the DSC configuration is pulled, Boolean for enabling tests on device connectivity changes, Boolean for enabling tests on device location changes, The minimum horizontal distance a device must travel before the location will be updated, The minimum time a device must travel before the location will be updated, The minimum bearing a device must change before the location will be updated, The quality of service for location updates that defines the device's location precision and power consumption, List of location bounds that define specific locations for tests to be performed within the bounds, The Southwest latitude of the location bound, The Southwest longitude of the location bound, The Northeast latitude of the location bound, The Northeast longitude of the location bound, Boolean for enabling passive tests only, The minimum time that must pass between passive tests, Boolean for enabling periodic server response tests, The frequency at which server response tests will be performed, Boolean for enabling server response tests over mobile, The minimum number of location changes between server response tests, The minimum time that must pass between server response tests, List of strings that define specific networks for tests to be performed on, The Wi-Fi network SSID or the mobile service provider name, Boolean for enabling periodic throughput test, The frequency at which throughput tests will be performed, Boolean for enabling throughput tests over mobile, The minimum number of location changes between throughput tests, The minimum time that must pass between throughput tests, Boolean for enabling on mobile connections, Boolean for enabling on Wi-Fi connections, The frequency at which the database will be exported, Boolean for enabling export of SDK error logs with database export, The maximum database file size before the SDK will try to force export the database, The maximum database file size before the SDK will try to force export the database and if unsuccessful, stop data collection, Boolean for collecting Wi-Fi access point scans, Boolean for collecting application data usage information, The maximum number of applications to track for application data usage information, Boolean for collecting Android system applications, List of strings of system application packages to include in ADU reports, The system application package name, The server URL for performing server response tests, The number of packets to be sent when performing a server response test, The size of the packets to be sent when performing a server response test, The timeout delay when performing a server response test, The server URL for performing download throughput tests, The server URL for performing upload throughput tests, The test file size to used when performing a throughput test, The timeout delay when performing a download throughput test, The timeout delay when performing a upload throughput test, List of QoS test servers to perform network tests based on the device location, The QoS test server latitude, The QoS test server longitude, The QoS test server URL for performing server response tests, The QoS test server URL for performing download response tests, The QoS test server URL for performing upload response tests, The server URL for registering apps and receiving a valid deployment key if a valid API key is provided, The server URL for checking the deployment key for the particular app package name is valid, the device UID refresh frequency, the server URL for exporting DB log files, the server URL for exporting logging files, the maximum number of daily SDK errors before SDK is shut down for 24 hours, the maximum allowed monthly mobile data quota, Boolean for reporting Wi-Fi connection change information, the server URL for reporting Wi-Fi connection change information, Boolean for reporting the device UID with the Wi-Fi connection change information, Boolean for enabling the populator for providing additional location information to the SDK, the server URL for the populator to get additional location information to the SDK, Boolean for checking the external IP address, the server URL for determining the external IP address, etc.

As such, the WDS 40 is configured to conduct testing and gather extensive and varied amounts of data 16 that can be stored, uploaded to, and used by, the system 18 as herein described.

In general, there are two types of KPIs that can be captured by the WDS 40, namely as shown in Table 1 below:

TABLE 1

| KPI Types Summary | |
|---|---|
| Test Type | Description |
| Active | An active test is one that uses network traffic to measure the quality of the network connection. These tests require the WDS to interact with a QoS test server to complete. Active tests include, for example: 1. Download throughput tests 2. Upload throughput tests 3. Server response tests: a. Latency b. Jitter c. Packet loss |
| Passive | A passive tests is one that only pulls data from the device OS without using any network traffic. Passive tests include, for example: |

TABLE 1-continued

| KPI Types Summary | |
|---|---|
| Test Type | Description |
| | 1. All device information 2. All connection information 3. Most QoS KPIs including data usage and location 4. All WiFi scan information 5. All application data usage information |

As indicated above, the collection rate of the KPIs is preferably determined by the configuration provided to the WDS 40 on a first initialization. The frequency of the active tests can be adjusted through the configuration server. Passive tests can be run when an active test is not being performed to avoid the tests impacting each other and to ensure that the amount of CPU being used is minimized. However, passive and active test can be run at the same time when appropriate, e.g. to glean additional information passively while an active test is already being run. It can be appreciated that the WDS 40 can be configured to collect only passive measurements. As also indicated above, preferably no personally identifiable information is recorded or transmitted.

The active tests on a network are performed by communicating with external test servers. These test servers can host various files of different sizes for performing download throughput tests. For upload throughput tests, the test servers can provide an un-throttled bucket to upload files of any size. Furthermore, the test servers can also echo back UDP packets sent from the WDS 40 for server response tests.

Figure 2B:
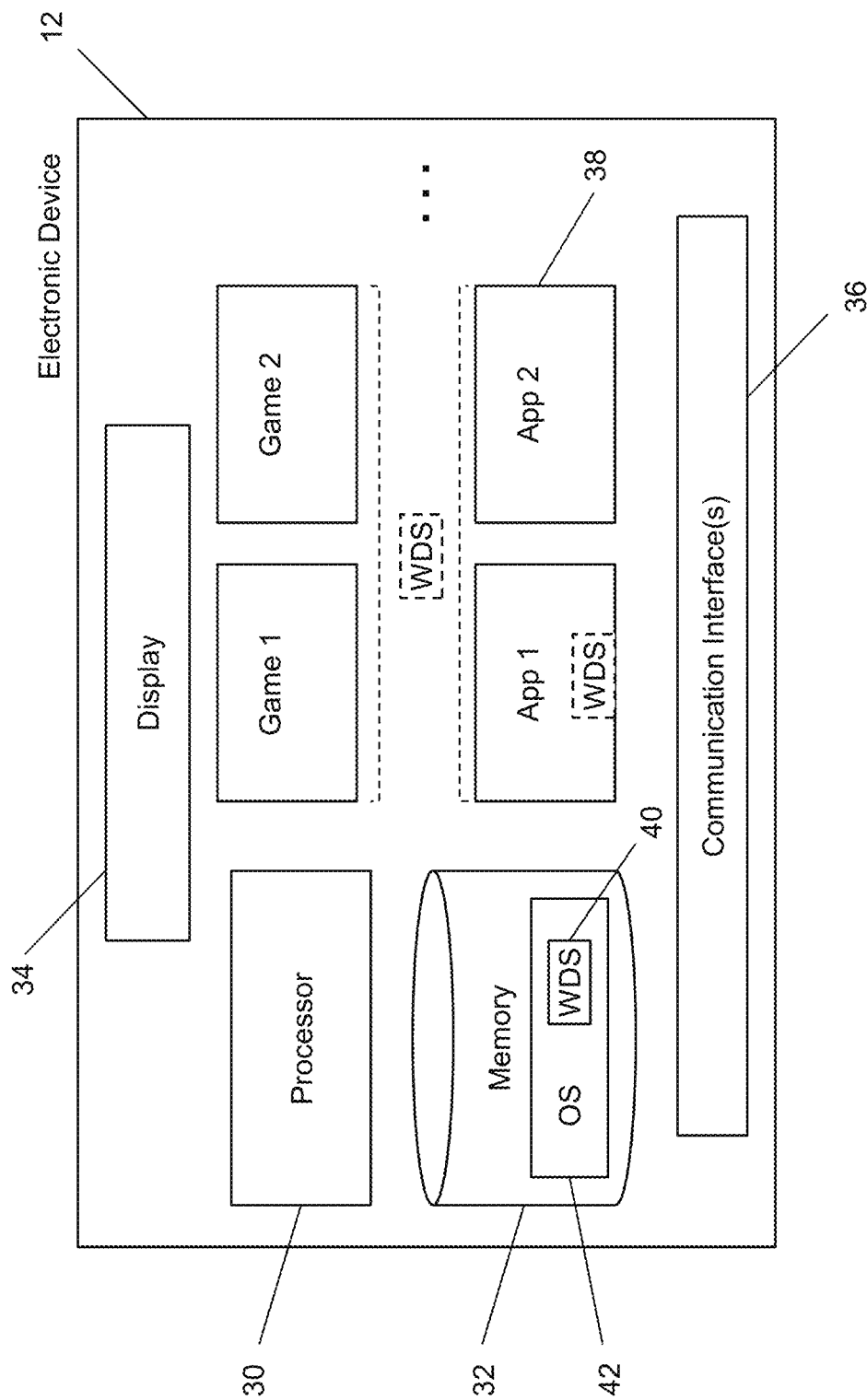
FIG. 2B is a block diagram of another configuration for a wireless device.

It can be appreciated that while in FIG. 2A each app 38 includes an embedded instance of the WDS 40 for monitoring and testing the app 38 and/or device 12, the WDS 40 can be deployed in various other configurations. For example, FIG. 2B illustrates that the WDS 40 can instead (or in addition to) reside in the OS 42 and centrally interact with a number of the apps 38. The WDS 40 may also reside as a stand-alone application or in another location or component of the device 12 as shown in dashed lines, with functionality to interact with a number of (or all) of the apps 38. Similarly, one or more of the apps 38 can additionally have the WDS 40 reside thereon (also shown in dashed lines), e.g., apps 38 that need to have such operations controlled internally rather than being opened up to an external program, module or routine. The WDS 40 can therefore be installed in several different apps (i.e. in a weather app and then a totally different game) and these different apps could potentially be installed on the same phone or a multitude of different phones. This allows for the scenario wherein the WDS 40 is installed several times on the same phone (e.g., as illustrated), in which case the WDS 40 should identify that it is getting data from the same device 12.

Figure 2C:
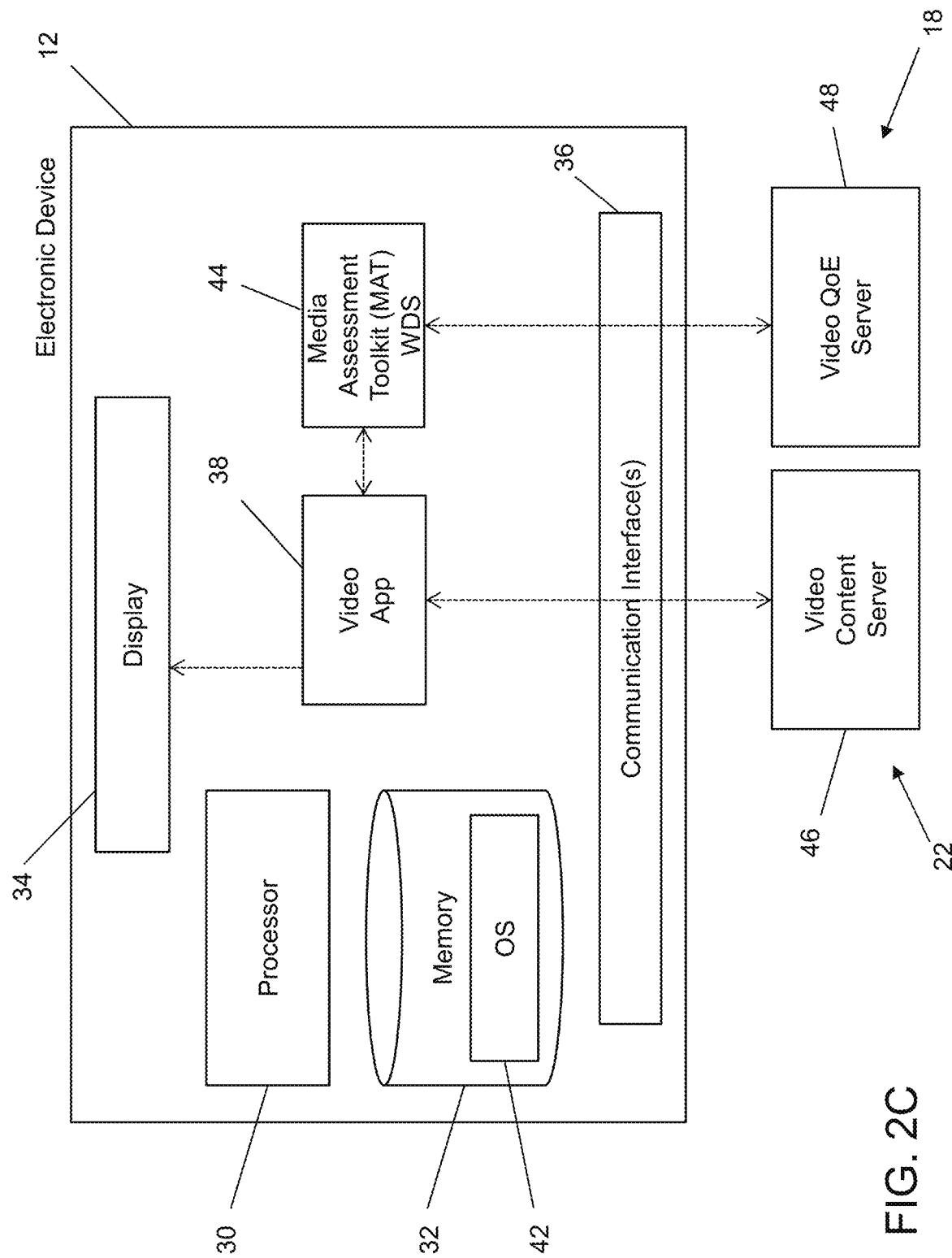
FIG. 2C is a block diagram of another configuration for a wireless device that includes a media assessment toolkit (MAT)

Turning now to FIG. 2C, the WDS 40 can also be tailored to specific applications or media types. In the example shown in FIG. 2C, a Media Assessment Toolkit (MAT) WDS 44 is shown, which is configured to monitor and report on a particular media type, such as video, particularly the quality of experience (QoE). The MAT WDS 44 enables the ability to collect video, user interactions, and device metrics directly from mobile devices 12.

In the configuration shown in FIG. 2C, the MAT WDS software library acts as the end-point middleware. The software library can be readily incorporated into a service provider's video applications 38. Its purpose is to monitor video QoE and report this information to a Video QoE Server 48 for data storage and processing by the system 18. The video content in this example is provided via a video content server 46. The MAT WDS 44 can include multiple different libraries for particular use cases and analytics. For example, video asset analytics allow for a detailed understanding of the video asset and the device used to view the video, providing metrics related to the video asset and device information, for instance: bitrate list from manifest, count of ABR change request per bitrate, duration of received segments per bitrate, number of segments per bitrate, rebuffering time, device serial number, device manufacture/model, OS and version, device MAC address, device IP address, network operator ID, device location, device percent memory free, device CPU utilization, software (library) version, timestamp (start/end times for viewing period), video asset name, video asset URL, stream type (HLS, MSS, HDS, MPEG-DASH, etc.), device connectivity type (WiFi vs. mobile), access point identifier (CID, BSSID, etc.).

User interaction analytics allow for a detailed view of the video experience and user interaction, to provide a better understanding of the user's engagement with the video application. The feature set for this type of analytics may include: average session duration, count of buffer underrun, server response time, asset play start time, play end time, pause start time, pause end time, FFwd start time, FFwd end time, rewind start time, rewind end time, etc.

Extended video analytics can also be performed to allow for a better view of the user's network performance and device impact, to provide a better picture of the device's experienced network performance. The feature set for this type of analytics may include: device battery drain rate, device storage utilization, customer ID, event log (manifest download—timestamp of request, URL, download time), application uptime (how long has the video app been running), upload throughput, download throughput, latency, packet loss, jitter, data usage, signal strength, number of radio frequency conflicts, network connecting time, network authentication time, event log (initial request to play-out time—join time in ms), etc.

The monitoring of the video asset is performed as a software library inside of a video application 38 and thus the features require the library to be properly initialized when the application 38 is opened by the user. The feature may require a reference to be passed to a media player, e.g., for each media player that is initialized by the video application 38. The feature may also require a reference to be passed to a URI or URL, may require an API to be opened to the associated timestamps, may also require a reference to be passed to the appropriate click listener, a reference to be passed to the application's create and destroy functions, an API to be opened to associated information, etc.

The MAT WDS software library inherently uses device resources to collect data. Tests concerning memory and CPU usage recorded over a ten minute period were conducted:

1. Base Test: This test represents the video streaming application running without streaming any video. This provides a baseline showing the footprint of the application's user interface and background processes.

2. Video Test: This test represents the video streaming application running while also streaming a video. In this test, video QoE metrics are collected and monitored.

3. QoS Test: This test extends the Video Test with the collection of network specific metrics. Download throughput, upload throughput, latency, jitter, and packet loss tests are conducted every thirty seconds. Increments in footprint above the Video Test represent the impact of the network performance tests on the device.

For memory usage, the percent differences between the three tests were found to be fairly minimal, with the QoS test requiring more memory that the video or base test because of the addition of the network assessment tests performed every thirty seconds. At the maximum, it was found that the difference in memory usage between the base test and the QoS test was approximately 4.5% at any given time. It is note that memory usage by any application on a mobile device 12 can affect the device's performance and battery consumption.

For CPU usage, the three tests were also performed using a device have two cores. It was found that the percent difference between the video and QoS tests was fairly minimal and in the base test, the CPU usage dropped as the device moved to a sleep state. At the maximum, it was found that the CPU usage between the video test and the QoS test was approximately 1.0% at any given time, on any given processor core. It was observed that there was a large differential between both the video and the QoS test and the base test, particularly as time passed. This is because the device 12 is moving into a sleep or depressed state as the user is no longer interacting with the application 38. CPU usage by any application on a mobile device 12 can affect the device's performance and battery consumption, similar to memory usage.

Figure 3:
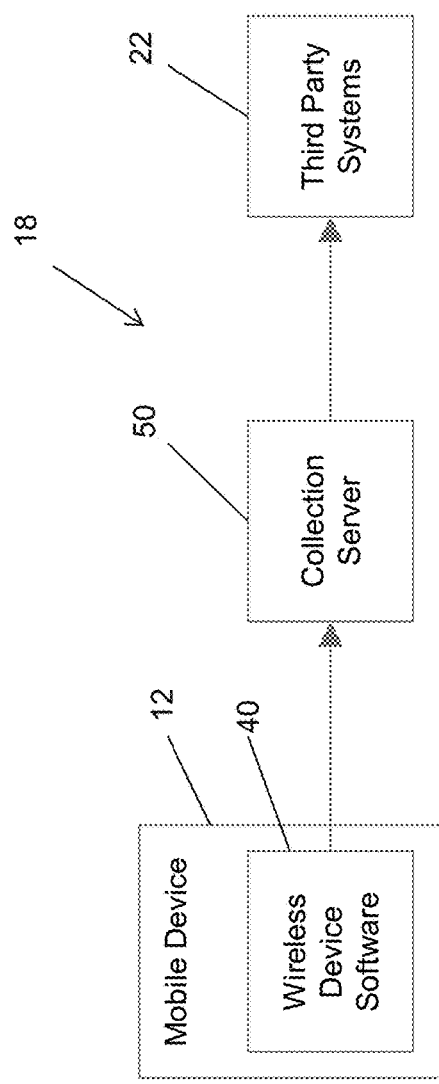
FIG. 3 is a block diagram of a configuration for collecting data from mobile devices using wireless device software (WDS)
Figure 4:
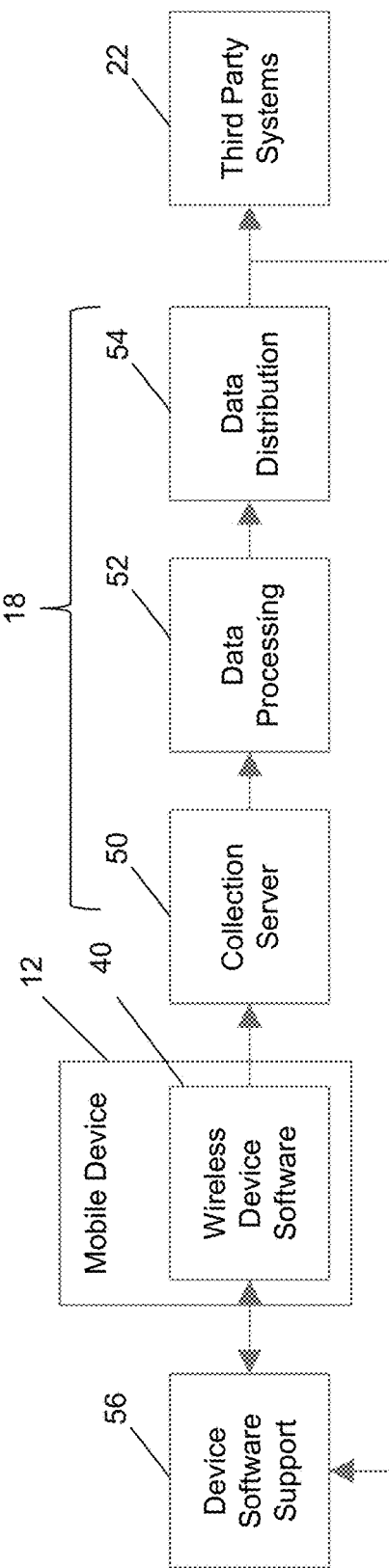
FIG. 4 is a block diagram of a configuration for collecting data from mobile devices using WDS with data processing, data distribution, and device software support.

A data collection configuration is shown at a high level in FIG. 3. Each mobile device 12 that is configured to operate the WDS 40 (using one or more apps 38) provides data to a collection server 50 that is deployed as part of the system 18. The collected data 16 is processed as herein described, along with data 16 obtained from other devices 12, to generate information and data for the third party systems 22. FIG. 4 provides further detail for the configuration shown in FIG. 3, in which the collection server 50 collects the data 16 and has the collected data processed by a data processing stage 52. The data thus processed is then provided to a data distribution stage 54 for distribution to the third party systems 22. FIG. 4 also illustrates that the data distribution stage 54 can enable the system 18 to provide feedback to the mobile device 12 by communicating with a device software support functionality 56 that is connectable to the WDS 40 to complete the feedback loop. The device software support functionality 56 can include the configuration server 124 shown generally in FIG. 1, as discussed in greater detail below.

By having the WDS 40 deployed in multiple different app types on multiple different device types operating with multiple different network types, not only can data be collected from a wider range of sources to provide a more meaningful and complete data set; a more comprehensive feedback network can be established thus providing the ability to reach a wider range of devices 12. Such a feedback network can be used for various purposes, including to modify the behaviour of the WDS 40. In addition to modifying the behaviour of the WDS 40, the feedback network can also be leveraged to create a two-way channel between the third parties 22 and the devices 12, apps 38, and even the networks 40 (e.g., network devices and infrastructure).

Figure 5:
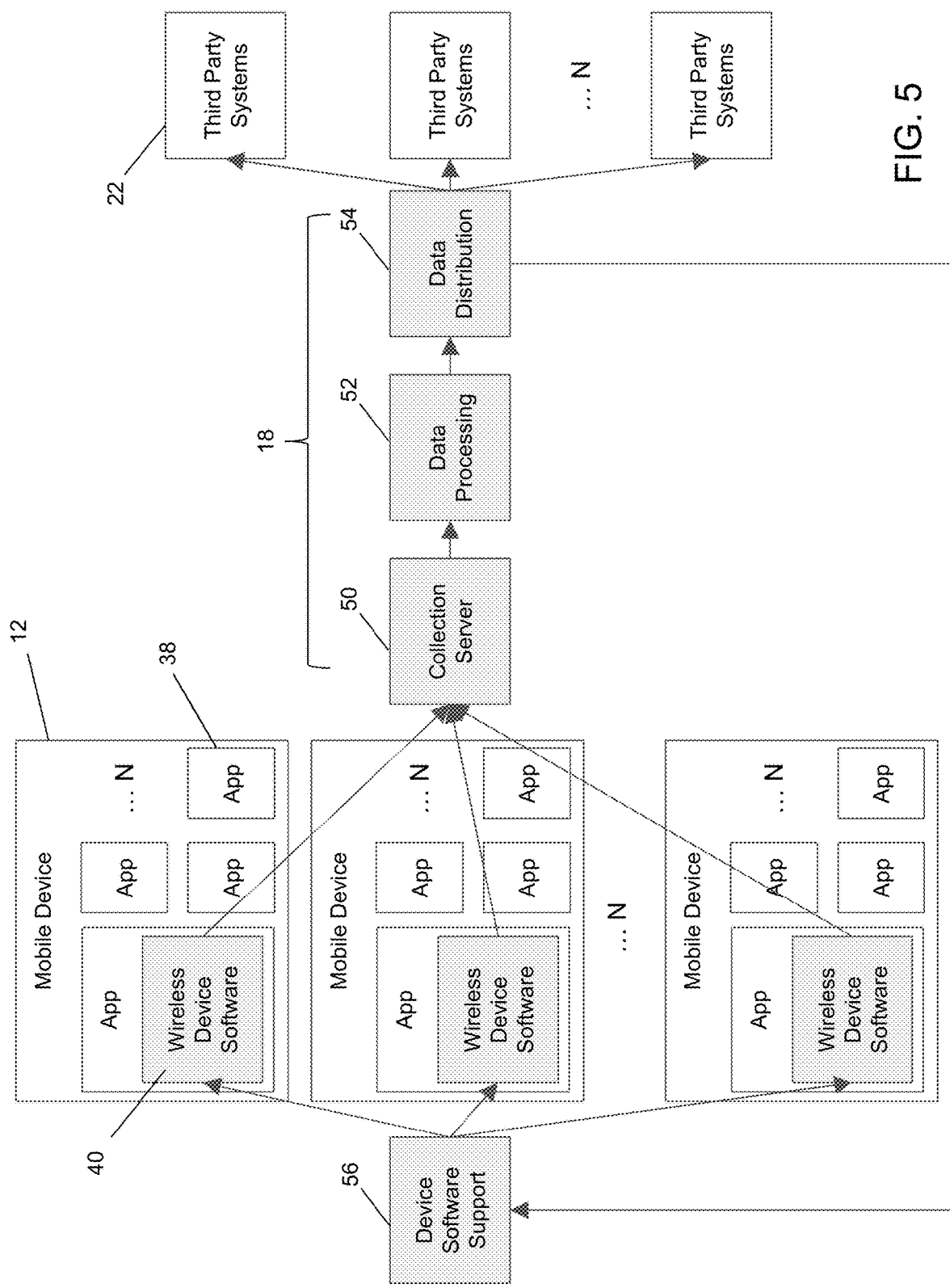
FIG. 5 is a block diagram illustrating the configuration shown in FIG. 4 for a plurality of devices and a plurality of third party systems.

FIG. 5 illustrates a configuration similar to that shown in FIG. 4, but showing the collection of data 16 from multiple devices 12 via multiple WDSs 40. As shown in FIG. 5, the plurality of mobile devices 12 shown can be served by a common device software support entity 56 and can provide data 16 to a common collection server 50. The system 18 may employ multiple regional collection servers 50 and device software support entities 56 as needed and thus the example shown in FIG. 5 is illustrative only.

Figure 6:
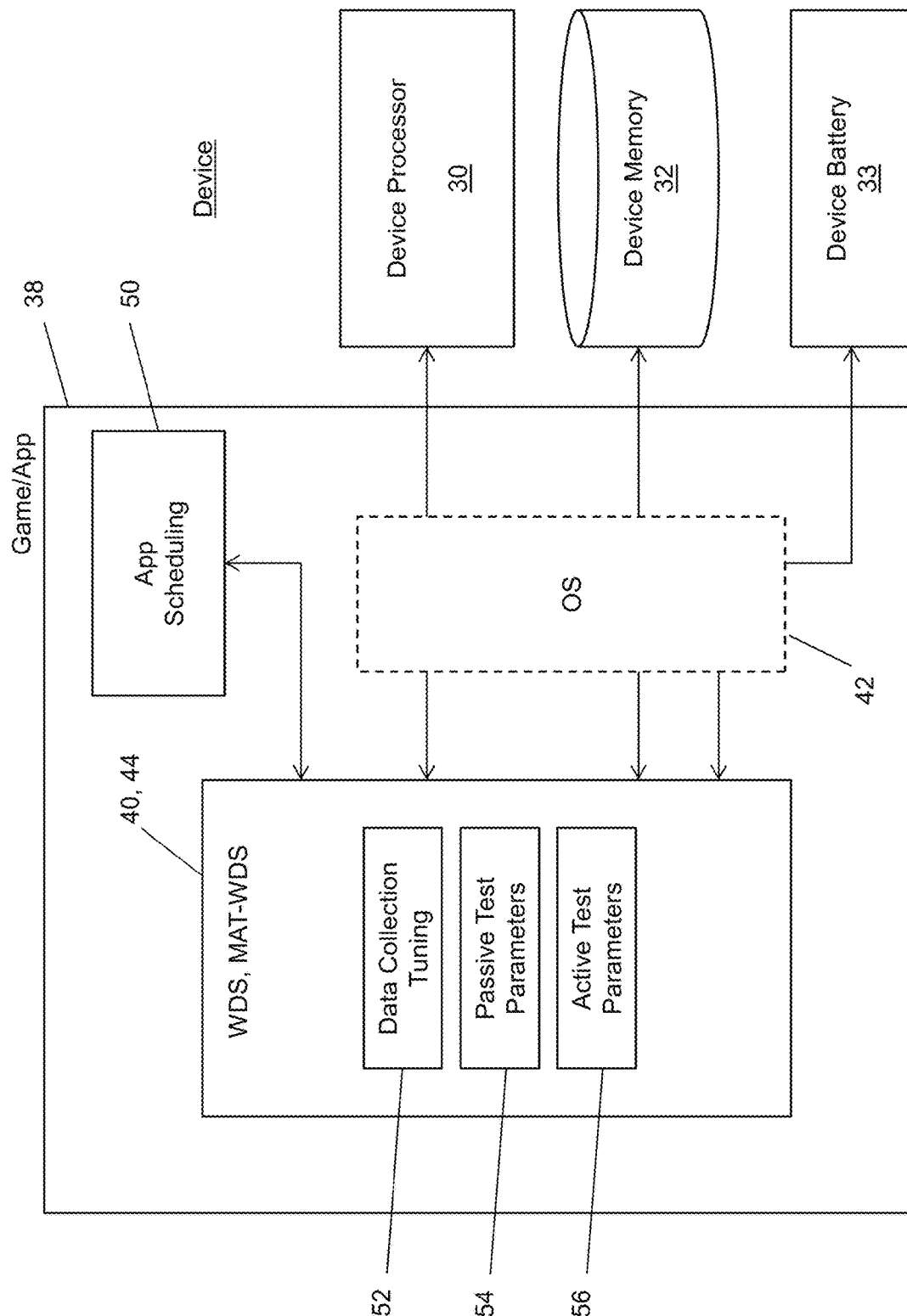
FIG. 6 is a schematic diagram illustrating a configuration for a game or app that includes a WDS and/or MAT-WDS.

FIG. 6 provides a schematic block diagram of a game/app 38 to illustrate the flexibility in which the WDS 40 (or MAT-WDS 44) can be configured in order to collect desired data sets and monitor desired KPIs. In this example, the app 38 includes an app scheduling module 50 that can include any software code or functionality in the app 38 that is responsible for interfacing with the WDS 40, 44 to schedule operations of the app 38, e.g., when to deliver ads, when to play certain types of media, etc. That is, in addition to the WDS 40 being configured to be minimally invasive to the app 38, the app 38 can also be reactive in order to permit certain tests to be performed and/or to use information gathered by the WDS 40 (e.g., network quality) to proactively adjust in-app actions to improve user experience. FIG. 6 also illustrates that the WDS 40, 44 can communicate with or receive information from the device processor 30, the device memory 32, and a device battery 33. As indicated above, this information may also be available by communicating with the OS 42.

By way of example, various WDS modules are exemplified in FIG. 6, including a data collection tuning module 52 for storing parameters (e.g., configurations from the configuration server) dictating how/when to perform certain testing, passive test parameters module 54 for storing certain passive testing methodologies, and an active test parameters module 56 for storing certain active testing methodologies.

As discussed above, the passive testing methodologies include pulling data from components of the device, such as the OS 42, without using network traffic.

Active tests use network traffic to measure the quality of the network connection. These tests require the WDS 40 to interact with a test server. The following describes the testing methodology for three example active tests.

Download Throughput Tests

The download throughput test is calculated by measuring the duration it takes to download a, e.g., 2 MB file from a test server over a HTTPS TCP connection. The WDS 40 establishes a connection to a test server that utilizes, for example, Amazon's CloudFront service to reach the service with the quickest response. The WDS 40 begins downloading a file of a defined size to measure the throughput. The WDS 40 calculates the throughput by dividing the test file size in bytes by the time it took to completely download file. This methodology can be used for all tests, except for a continuous throughput test in which throughput is constantly determined until the transfer has reached a steady speed. That speed can then be recorded as being the throughput.

The frequency of the download throughput tests can be adjusted as well as what server is used to download the file from. The size of the download throughput tests can be adjusted using the configuration server 124 according to the following Table 2:

TABLE 2

| Download Throughput Test Sizes | |
| --- | --- |
| Test Size | Description |
| Micro | 250 kB |
| Small | 500 kB |
| Medium | 1 MB |
| Medium-Large | 2 MB |
| Large | 5 MB |
| Huge | 10 MB |

TABLE 2-continued

| Download Throughput Test Sizes | |
| --- | --- |
| Test Size | Description |
| Continuous | Download until steady rate achieved |

The download throughput tests are not designed to measure the maximum throughput of the current connection, but rather a Medium-Large test (2 MB file) is selected to simulate loading a webpage or beginning a video session on a mobile device. A continuous test can be used to measure the maximum download throughput of a connection.

Upload Throughput Tests

The upload throughput test is calculated by measuring the duration it takes to upload a, e.g., 1 MB file of random bytes to a test server over a HTTPS TCP connection. The WDS 40 begins uploading a file of a defined size to measure the throughput. The WDS 40 calculates the throughput by dividing the test file size in bytes by the time it took to complete the upload the file.

The frequency of the upload throughput tests can be adjusted as well as what server is used to upload the file to. The size of the upload throughput tests can be adjusted using the DSC according to the following Table 3:

TABLE 3

| Upload Throughput Test Size | |
| --- | --- |
| Test Size | Description |
| Micro | 250 kB |
| Small | 250 kB |
| Medium | 500 kB |
| Medium-Large | 1 MB |
| Large | 1 MB |
| Huge | 5 MB |
| Continuous | Upload until steady rate achieved |

The upload throughput tests are not designed to measure the maximum throughput of the current connection, but rather a Medium-Large test (1 MB file) is selected to simulate uploading a medium definition image to social media. A continuous test can be used to measure the maximum upload throughput of a connection.

Server Response Tests

A server response test includes a latency, jitter, and packet loss test in one connection. The service response test is calculated by measuring the round-trip duration of sending a set number of protocol (e.g., UDP) packets to a test server over a protocol (e.g. UDP) connection. The packets are sent at a precise timing in a prescribed sequence from the WDS 40. The packets are received by the test server and immediately echoed back to the WDS 40. The WDS 40 calculates the latency based on the total time it takes for the packets to be sent and received by the WDS 40. The jitter is calculated by measuring the difference or deviation in time the ordered packets are received. The packet loss is based on packets that are returned out of order or missing from the sequence.

The number of packets to send, the size of the packets, and the destination server can be adjusted using the configuration server 124. Generally 20 packets of 1 byte each are used to perform the server response tests. The latency is measured for each packet that is sent and received back to the WDS 40. From this set of latency measurements for each packet, the maximum, minimum, and average latency is calculated and stored. Similarly the jitter is measured for each set of packets received back to the WDS 40. From this set of jitter measurements, the maximum, minimum, and average jitter is calculated and stored. The packet loss is calculated based the number of packets not returned to the WDS 40 in the same order as they are sent. The packet discard rate is calculated based on the number of packets not returned to the WDS 40 regardless of the order received.

In the example described herein, UDP packets are selected to simulate latency sensitive applications, such as video and VoIP calling. High jitter indicates poor user experience and can most noticeably affect video and voice delivery. A high packet loss typically indicates network congestion but can also be caused by weak radio signal, or faulty networking hardware or drivers. High packet loss often most affects the user experience in streaming applications and online gaming.

The WDS 40 should be implemented to minimize battery usage. At default configurations, the WDS 40 monitoring could increase battery usage by roughly 1%. However, since it is unlikely that the system 18 will be able to actively monitor QoE for 24 hours of a day, over the course of an average day consumption can be made to be considerably less than 1%. This number may be modified by increasing or decreasing the frequency of QoE testing.

The following provides estimates of the incremental battery usage associated with embedding the WDS monitoring capabilities into an application 38. Four separate tests were performed across 10+ device types, the average results are outlined herein.

Baseline Test The baseline test is intended to represent an average application running without any QoE tests being performed.

Every 15 Minutes This test represents the battery usage of an application running while the WDS collects the QoE metrics once every 15 minutes.

Every 5 Minutes This test represents the battery usage of an application running while the WDS collects the QoE metrics once every 5 minutes.

Every 2 Minutes This test represents the battery usage of an application running while the WDS collects the QoE metrics once every 2 minutes.

TABLE 4

Battery Usage Test Results

| Data Collection Interval | Result |
|---|---|
| 15 minutes | Over a 30 minute session, you would lose 23 seconds of battery usage |
| 5 minutes | Over a 30 minute session, you would lose 1.1 minutes of battery usage |
| 2 minutes | Over a 30 minute session, you would lose 2.6 minutes of battery usage |

The WDS 40 should also be configured to minimize data usage. At default configurations, the WDS 40 can be configured to only use 25 MB per month per device 12 of mobile data, with most of the data usage is associated with performing active tests on the network 14, and exporting the database to the reporting servers. Below summarizes the KPIs that use network data:

TABLE 5

KPIs Using Network Data

| Data Type Category | KPI | Data Usage |
|---|---|---|
| QoS | Upload Throughput | 1 MB |
| QoS | Download Throughput | 2 MB |
| QoS | Latency | 1 KB* |
| QoS | Jitter | 1 KB* |
| QoS | Server Response Packet Loss | 1 KB* |

*1 KB used for obtaining the latency, jitter, and packet loss KPIs as part of server response test Depending on the customer and network being monitored, different behaviours for the WDS are appropriate. The following configurations outline the amount of data used over a 31-day period.

TABLE 6

Data Usage Configurations

| Configuration | Data Consumption | | Details of Tests |
| | 1-Day | 31-Days | |
|---|---|---|---|
| A | ~3 MB | <100 MB | Download throughput every 2 hours Upload throughput every 2 hours Latency tests every 30 seconds Jitter tests every 30 seconds Packet loss tests every 30 seconds |
| DEFAULT B | ~16 MB | <500 MB | Download throughput every 15 minutes Upload throughput every 15 minutes Latency tests every 30 seconds Jitter tests every 30 seconds Packet loss tests every 30 seconds |
| C | ~33 MB | <1 GB | Download throughput every 8 minutes Upload throughput every 8 minutes Latency tests every 30 seconds Jitter tests every 30 seconds Packet loss tests every 30 seconds |
| D | ~260 MB | <8 GB | Download throughput every 60 seconds Upload throughput every 60 seconds Latency tests every 30 seconds Jitter tests every 30 seconds Packet loss tests every 30 seconds Export data once per day |

With respect to the CPU, the WDS 40 should not have a noticeable impact on device CPU usage and should not slow down the performance of the wireless device 12.

With respect to data storage and reporting frequency, the WDS monitoring results are stored locally on the device 12 until being reported up to a server. All reported data should then be cleared from the wireless device's storage. The frequency of reporting is configurable using the WDS 40 however the default can be set to once every day, e.g., 24 hours while connected to WiFi, as an example.

The WDS 40 can report data as SQLite files using an HTTPS POST on port 443. Once stored server-side, information can be encrypted and protected by the firewalls and theft prevention mechanisms of the particular data warehouse. The collection of user identifiable data is an optional feature of the WDS 40. When collected, the system 18 can hash all device identifier information to make the information anonymous.

Any IP connection used by the wireless device 12 may be monitored by the WDS 40. This includes but is not limited to any Wi-Fi, 2G, 3G, and 4G connections. Further, since all monitoring and reporting is performed over-the-top (OTT), the WDS 40 functions independent of the service provider's consent for such monitoring, which is particularly advantageous for competitive network analyses.

In one implementation, GPS data is used only if the wireless device 12 has it natively enabled. Since many users choose to disable GPS for the power savings, when GPS is unavailable, the WDS 40 can still have access to location information collected by the device's native network based location system (e.g., cell tower and Wi-Fi access point triangulation).

Figure 7:
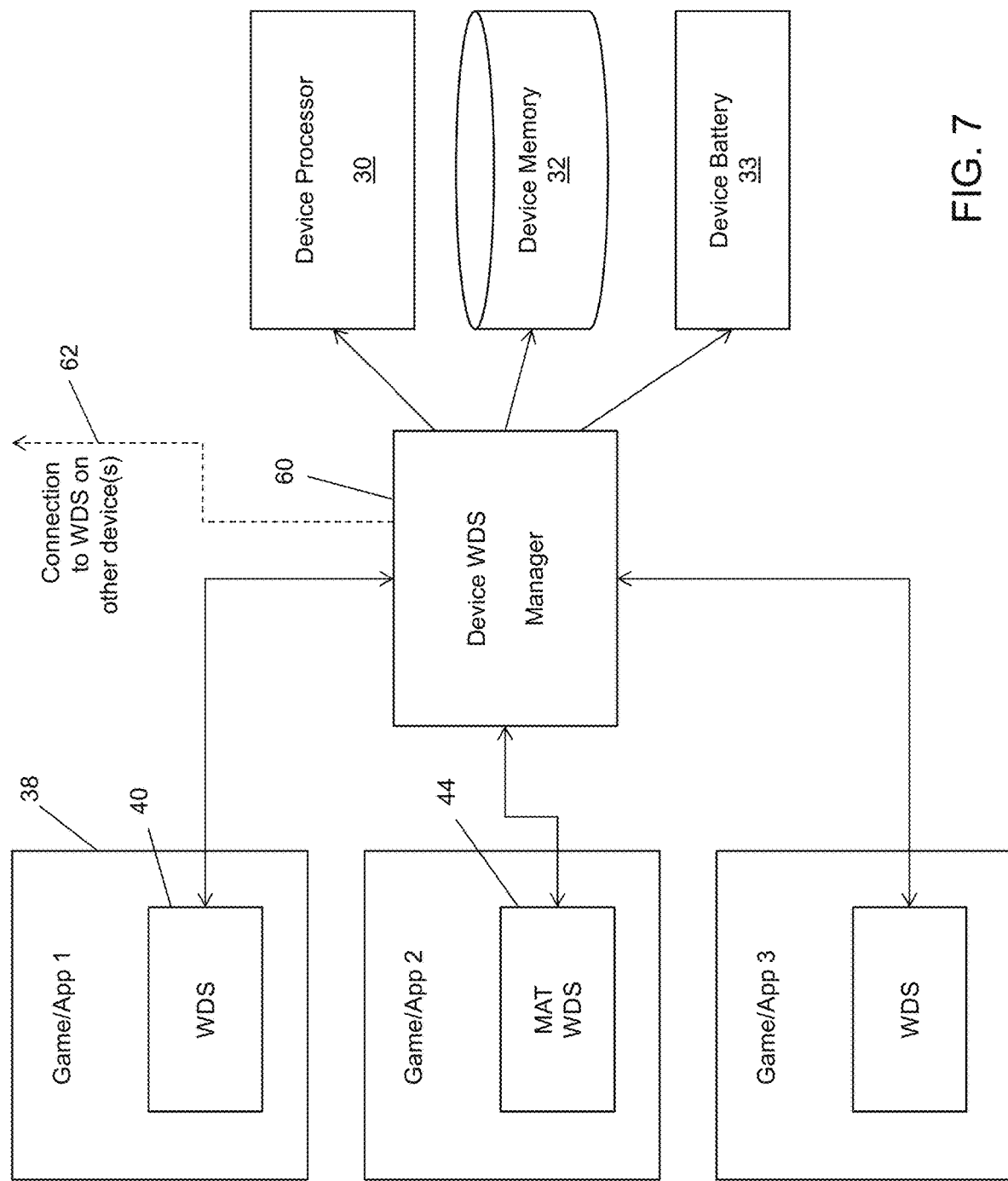
FIG. 7 is a schematic diagram illustrating a configuration for centrally managing a plurality of WDS on a device.

As shown in FIG. 2A, a device 12 can have multiple applications 38 each embedded with the WDS 40. FIG. 7 illustrates an alternative configuration in which a device WDS manager 60 is included in the device 12 for managing testing operations that may be performed by different WDSs. This can avoid duplicate tests being performed by the WDSs and allows for data to be shared, particularly data that is used for passive testing. Also, an external connection 62 can be provided to other WDSs 40 or WDS managers 60 on other devices, to allow for peer-to-peer coordination between devices on, for example, the same network 14 or communicating with the same test servers, to achieve better testing efficiencies. One instance of the WDS 40 can therefore communicate with another instance of the WDS 40 on the same device 12 or a nearby device 12 or a device 12 that happens to be on the same network.

Figure 8:
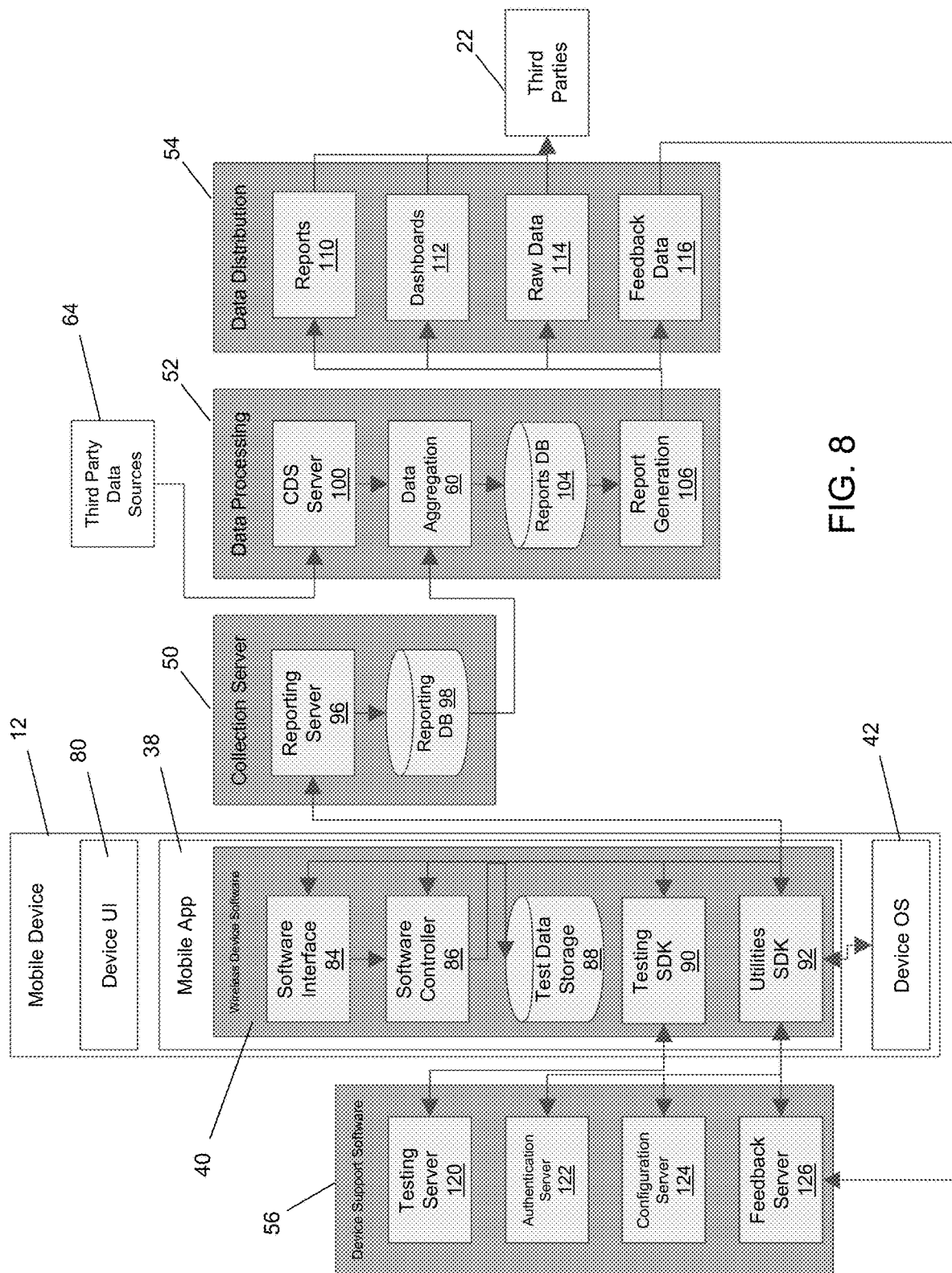
FIG. 8 is a block diagram illustrating additional detail for the configuration shown in FIG. 4.

Further detail concerning the functional blocks shown in FIGS. 4 and 5 is now provided in FIG. 8. Beginning with the mobile device 12, the WDS 40 in this example is embedded in a mobile app 38 and includes a software interface 84 for interfacing between the app 38 and a software controller 86 for controlling the tests and other operations of the WDS 40. The WDS 40 also includes a test data storage 88 for storing data acquired during the tests, a testing SDK 90 for performing one or more particular tests that involve operation of the app 38 and/or the device itself via the device OS 42. The WDS 40 also includes a utilities SDK 92 that includes methods, functions, and APIs that can be used to pull data and info from the device OS 42. Such methods can be used to export data to the collection server 50.

The utilities SDK 92 is also operable to communicate with the collection server 50. The collection server 50 includes a reporting server 96 for receiving test and any other data being reported by the WDS 40, and a reporting database 98 for storing the test data for use by the data processing module 52.

The data processing module 52 includes a central data services (CDS) server 100 that provides data source APIs for different third party data sources and metadata. The CDS server 100 can also provide local storage for quick responses to the data aggregation operations. The CDS server 100 also interfaces externally with the one or more third party data sources 64 and internally with the data aggregation module 60 discussed above. The data aggregation module 60 obtains (i.e. pulls, requests or otherwise receives) the data collected by the collection server 50. The data aggregation module 60 also performs aggregation of the various data and data types and stores the aggregated data in a reports database 104 to be accessed by a report generation module 106 for generating various types of reports, dashboards, etc. It can be appreciated that data can also be pulled in from third party data sources and not only the collection server. For example external databases can be pulled in that help translate latitude and longitude into city names where the data was collected.

The report generation module 106 can generate various types of data for distribution to third parties 22 as shown in FIG. 8. For example, the report generation module 106 can generate reports 110 and/or dashboards 112, and can prepare raw data 114 to be analyzed elsewhere. The report generation module 106 can also prepare feedback data 116 to be sent to the device support software 56, in this example configuration, to a feedback server 126 that is part of such device support software 56.

The device support software 56 can include various servers that can communicate with and control, monitor, update, fix, kill, or otherwise interact with the WDS 40 in the various devices 12. In this example, the device support software 56 includes the feedback server 126 mentioned above, as well as a configuration server 124 for managing the configurations for the WDS 40, and an authentication server 122 for authenticating the WDS 40 to ensure that it is from an appropriate app and app developer. The device support software 56 also includes a testing server 120 for interacting with the testing SDK 90 for providing and updating/configuring tests and test sets to be performed by the WDS 40.

The WDS 40 can be configured as a software library that is embedded in the mobile device apps 38 in order to report and integrate with the collection server 50 and data processing module 52. The libraries of the WDS 40 can be added to an existing application to collect device, connection, network QoS, Wi-Fi, and KPIs. As shown in FIG. 8, the WDS 40 interacts with the device software support entity 56, which can include different servers with which the WDS 40 can communicate during its operation. The example configuration shown in FIG. 8 includes servers responsible for authentication and initiation (authentication server 122), configuration (configuration server 124), testing (testing server 120), and reporting (reporting server 96) that communicate with the WDS 40. The authentication server 122 can be used to dictate which application programming interface (API) keys and apps 38 are allowed to operate and collect data through the WDS 40. The configuration server 124 can be used to set specific rules and parameters for the operation of the WDS 40. The WDS 40 can also use testing servers 120 to perform active tests on the connected network 14. The reporting servers 96 are used to upload the data payloads from the WDS 40 to the system 18.

As indicated above, the authentication server 122 can be used to verify that applications 38 are using the correct API key for each developer, and to provision each app with a unique deployment key. Each application developer can be assigned an API key, which is used to generate a unique deployment key for each application 38. This deployment key is used to control the configuration of the WDS 40, as well as track the data collected by each application 38.

The authentication server 122 can also check that the app 38 has not been registered with the system 18 previously. This ensures that the data collected through the WDS 40 is associated back to the correct application 38 and developer, e.g., to account for revenue sharing. The authentication server 122 also allows the control of shutting down specific applications or developers from collecting data at any time, e.g. for implementing a "kill switch".

The WDS 40 can be configured to check with the authentication server 122 on first initialization of the WDS 40, and periodically (e.g., every few days) following initialization. This allows for the authentication server 122 to shut off any application 38 from collecting data 16. All communication and data transferred between the WDS 40 and the authentication server 122 is preferably secured and encrypted. For example, the WDS 40 can be given a three day local cache on the device 12 to prevent the WDS 40 from checking in with the authentication server 122 on every initialization to prevent extra traffic or chattiness over the network 14, and to act as a local cache on the device 12.

As discussed more generally above, the testing servers 120 are used to perform active tests on a network 14 through interaction with the WDS 40. The testing servers 120 can host various files of different sizes for performing download throughput tests. For upload throughput tests, the testing servers 120 can provide an un-throttled bucket to upload files of any size. Furthermore, the testing servers 120 can also echo back packets for the corresponding protocol (e.g., UDP packets) sent from the WDS 40 for server response tests. Multiple testing servers 120 can be setup as necessary around the world. The testing servers 120 can be deployed on a cloud or on-premises hosting environment. The WDS 40 determines which server 120 to use for performing active tests by choosing the most appropriate server 120 based on the device's geographic location. For example, the closest route may require using undersea cable whereas a server slightly farther away may be able to make use of faster land-based cable (i.e. to account for more than just geographical proximity). The testing servers 120 used by the WDS 40 can be configured through the configuration server 124. All communication and data transferred between the WDS 40 and the testing servers 120 is preferably secured and encrypted.

The configuration server 124 is designed to allow full control over the WDS 40. The configuration server 124 allows the system 18 to adjust data collection frequencies, data reporting frequencies, and the types of data being collect for devices 12 out in the field. Each WDS deployment can be assigned a unique deployment key, used by the WDS 40 to periodically check what data collecting/reporting behaviors the WDS 40 should be adhering to. This allows the dynamic adjustment of the WDS 40 performance to fine tune battery consumption, network chattiness, and other parameters.

A configuration profiled held by the configuration server 124 is downloaded to the WDS 40 upon the initialization of the WDS 40. For example, the configuration server 124 may hold a new policy that says "Do not collect data in Country X". That new policy, or that new profile for data collection, would be downloaded and executed by the WDS 40. A new configuration profile is pulled to the WDS 40 on a specified frequency. The WDS 40 can also have a local cache on the device 12 (e.g., three days), of the configuration server 124, to prevent the WDS 40 from pulling configurations from the configuration server 124 too frequently. All communications and data transferred between the WDS 40 and the configuration server 124 are preferably secured and encrypted.

The configuration file/data can be signed by the service with a known, trusted security certificate. The signature is passed down with the configuration server's configuration where it is verified in the WDS 40 on the device 12. The WDS 40 may then try to match the signature on the server configuration with one generated locally on the device 12 using the same certificate as the server side. If the signature generated on the WDS 40 does not match the one provided by the configuration server 124, the WDS 40 can be configured to reject the configuration and continue to use the previous configuration, or a default. This co-signing verification between the server 124 and WDS 40 ensures that the configuration is not compromised. Compromising the configuration supplied to the WDS 40 can have varying degrees of impact on the user device, the amount of data used, the battery impact, etc.

With the configuration shown in FIG. 8, the following process flow can be implemented. The WDS 40 can initialize by checking with the authentication server 122 to run or not. The WDS 40 then pulls a configuration file from the configuration server 124 to direct the operation of the WDS 40. Data is then collected by the WDS 40 by interacting with the device OS to capture various KPIs about the device, network connection, network QoS, WiFi scan information, and application data usage, etc. as discussed herein. The WDS 40 can also perform network performance tests against the testing server(s) 120.

Data is collected by the WDS 40 and stored in a database (e.g., SQLite) over a particular time period, e.g., a 24 hour period. The database is then exported to the reporting server(s) 96. The reporting servers 96 can parse through the database to split the data into different tables, e.g., within BigQuery. In this example, the data is stored in various BigQuery reporting tables depending on the type of data. On a periodic basis, e.g., hourly, dataflow jobs can be run to add additional metadata to the raw data uploaded from the WDS 40. This metadata includes tagging the raw data with country, region, and city metadata, etc. Once the data is processed by the dataflow jobs, data is made available in various tables and views. These tables and views allow raw data export or building visualizations and standard reports with other tools as herein described. It can be appreciated that standard reports, custom reports, customer dashboards, and raw data can all be made available through a combination of custom reports and dashboards or through different views and exports from the tables (e.g., from BigQuery).

Figure 9:
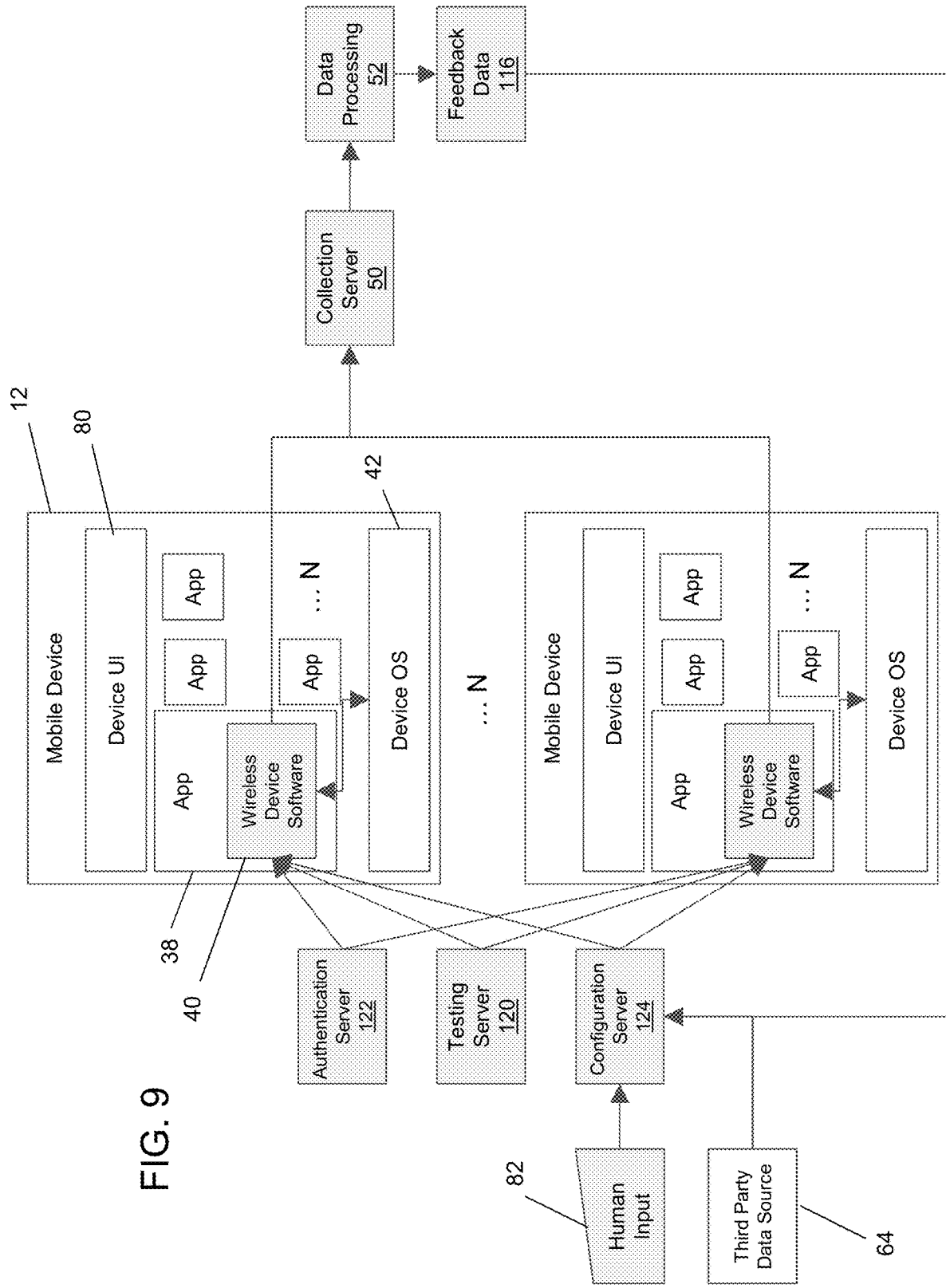
FIG. 9 is a block diagram illustrating a configuration in which feedback and configuration servers are used to communicate and/or control apps using wireless device software in a plurality of mobile devices.

As illustrated in FIG. 9, the collection server 50 is configured to collect data from multiple mobile devices 12 by having the reporting server 96 interfaced or otherwise in communication with the WDS 40 in each of the multiple devices 12. It can be appreciated that while the collection server 50 can communicate with multiple devices 12, the wider system can include multiple collection servers 50, e.g., regionally placed, each collection server 50 being capable of communicating with the data processing module 52. FIG. 9 also illustrates that the feedback data 116 generated by the report generation module 106 can be provided to the configuration server 124 in order to enable the configuration server 124 to control the behaviour of the WDS 40 in each device 12.

The configuration server 124 can also utilize third party data sources 64 and human input 82 in order to control operation of the WDS 40 on any one or more of the devices 12. The third party data sources 64 and human input 82 can be provided by any party authorized to control the configuration server 124 for a particular purpose. For example, an administrator of the system 18 or a third party 22 (e.g., a game/app developer) can access feedback data 116 in the form of usage and performance data and apply human input 82 directly to the configuration server 124 for modifying the behaviour of a targeted app 38 (using the WDS 40 or other functionality).

Figure 10:
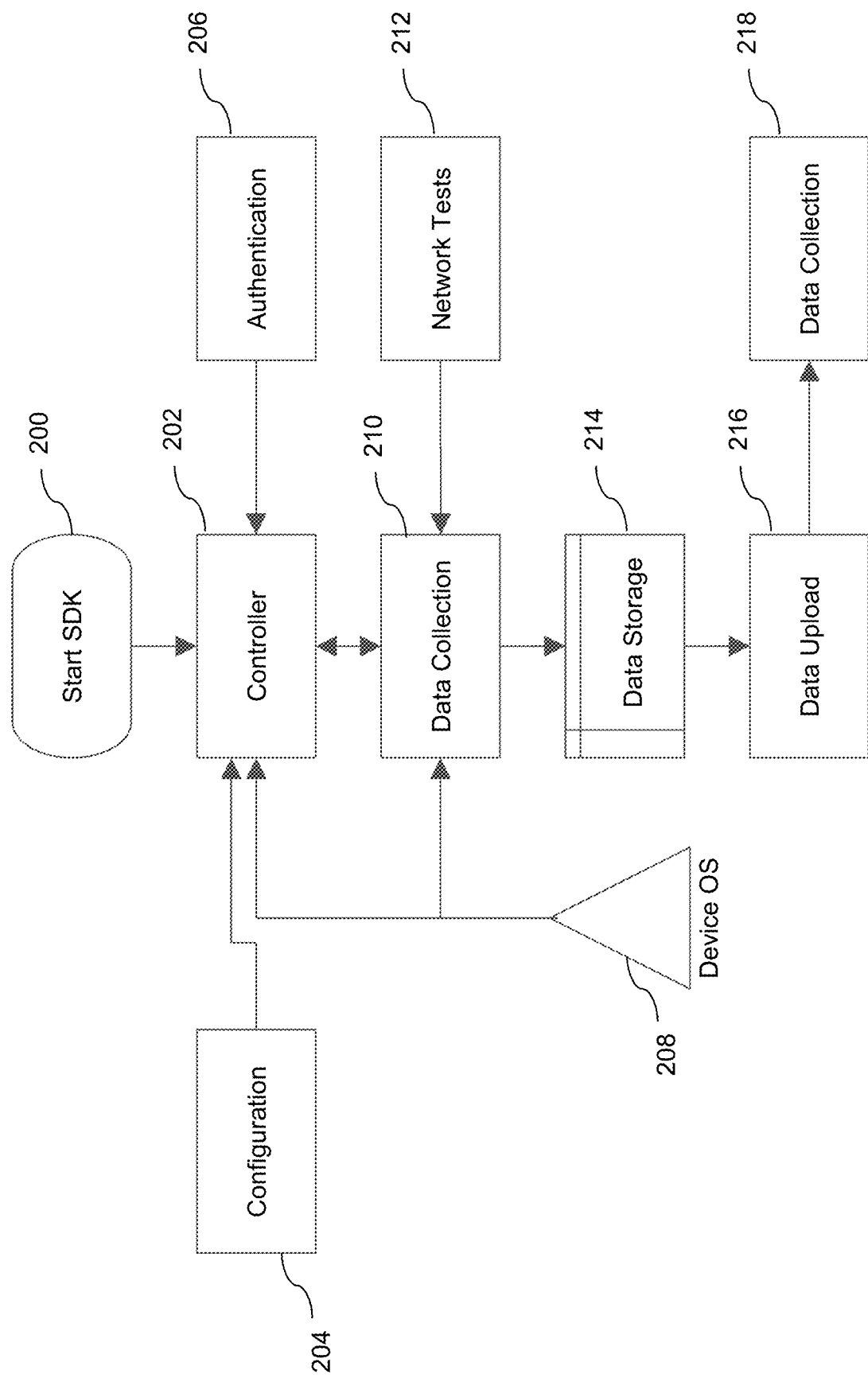
FIG. 10 is a flow chart illustrating computer executable instructions performed in collecting performance and/or usage data on a device.

FIG. 10 illustrates data flow in gathering, aggregating, and analyzing data from mobile devices 12 as herein described. At step 200 the mobile application (or operating system, etc.) that contains the WDS 40 initiates the WDS 40 to begin collecting test data collection on the mobile device 12. It can be appreciated that as shown in FIG. 2, the OS 42 or other components of the device 12 can be used to initiate the WDS 40 to begin the data collection. The operation of the WDS 40 in this example is controlled by a controller 202, which coordinates authentication of the WDS 40 at step 206 and obtaining the proper configuration at step 204. The controller 202 can also coordinate obtaining information from the OS 42 at step 208, e.g. for collecting data at step 210 for passive testing. The data collection at step 210 is also performed based on network tests performed in connection with the device support software 56 at step 212.

The collected data is stored at step 214 and uploaded to the system 18 at step 216. The uploaded data is collected at step 218 for subsequent aggregation, analysis, processing, reporting, etc.

The data can be aggregated by adding the uploaded data to a large set of tables, e.g., split by day. The large set of tables can then be queried according to certain variables. In one configuration, data for all apps 38, devices 12 and networks 14 can be placed in the same data storage, and can be grouped in various ways depending on what is meant to be shown in the reports, dashboards, etc.

The data is analyzed in various ways, by the system 18 and/or the third parties 22. For example, the data 16 can be broken down by country, region, city, etc.; as well as by time periods (e.g., month). Custom groupings can also be performed by network type (2G vs 3G vs 4G) and statistics determined and displayed for those groupings. Custom groupings can also be performed to determine application package names, application names. It can be appreciated that determining application package names is non non-trivial since a single application can have multiple packages as part of its installation, and also different names in different languages. The system 18 is configured to coalesce the packages to obtain a single-language list of app names and their associated package names (since package names are globally unique). Custom groupings can also be prepared for service providers based on MCCs and MNCs. This allows brands to be matched up with operators for a given network 14, rather than relying solely on the network 14 reported by the device 12 (e.g., since there may exist a roaming situation or other scenario where the provider listed by devices 12 may be inconsistent).

The system 18 can therefore combine the uploaded data from a multitude of different mobile applications 38 and deployments from a multitude of devices in various networks, regions, etc. The system 18 is also able to obtain data 16 that is specific and relevant to particular game/app developers, network operators, device manufacturers, etc., by parsing or packaging this comprehensive data set accordingly. The system 18 is also able to pull additional metadata from several other third-parties and open data sources 82. The system 18 can output raw data files as well as make data available for visualizations through user interfaces (e.g., dashboards).

For example, a set of the dataflow jobs can be used to add additional metadata to the raw data being uploaded from the WDS 40. These dataflow jobs can be performed periodically, e.g., hourly on the last hour of data upload from the WDS 40. The results can then be grouped into daily tables at a particular time, e.g., GMT midnight, for querying.

The following is a summary of the processes that can take place throughout the dataflow jobs:

1. For many fields, enumerators can be used in the WDS 40 for simplicity and for reducing the amount of data uploaded. The dataflow jobs can be used to swap out the enumerations for human-readable strings.

2. Country, region, and city tags can be added to the data based on the reported latitude and longitude.

3. The geohash can be calculated for the reported latitude and longitude.

4. The device storage remaining and device memory remaining can be calculated.

5. Mapping from MCC and MNC to a service provider branding can be added.

6. Mapping from an application package name to application name can also be added.

It can be appreciated that several open and paid third party sources can be used to complement the raw data collected by the WDS 40.

The data reports generated can therefore be constructed in various ways and, if desired, additional third party data sources 82 can be incorporated. Since the data is collected from a multitude of WDSs 40 deployed within various types of applications running on various types of OSs 42 and device types; all within, crossing between and/or interacting with various network types 14 and regions; a more comprehensive view of how a network, device, application, operating system or electronic environment more generally can be assessed. The data that is collected and stored can be queried in many ways for many purposes to suit the needs of different third parties 22 wanting access to such a wider and more complete set of data. Since the WDS 40 can be deployed within various types of apps 38, such as games that enjoy substantial circulation and reach across multiple platforms, regions, an unobtrusive tool is deployed and can be leveraged gather such desired data on a periodic and ongoing basis without adversely affecting the performance of the devices 12 or apps 38.

In addition to providing a system that enables crowd-sourced data from a multitude of devices across a multitude of applications, networks, and environments to be gathered and analyzed in a way that allows more meaningful and complete data to be obtained without overly impacting the devices and networks within which the system operates in an adverse manner as described above; various other applications, configurations, and use cases making use of or configuring the underlying system 18 will now be described.

User Informed Testing

The system 18 described above contemplates testing networks 14 and generating test data in a few different ways, namely:

a) Requesting the mobile device OS 42 for information (i.e. device API calls).

b) Creating network traffic and running "active tests". For example, determining the throughput of a network by downloading a file from a controlled testing server 120 then watching the performance of that owned and controlled download. In this case, the network traffic being analyzed was created for the express purpose of performing a test.

c) Watching network traffic initiated by the user or some other mobile device service that has not been generated for the specific purpose of performing a test, i.e., a "passive test". For example, a network testing service can examine how quickly a user is able to upload a photo on Facebook or download a YouTube video, and then determine throughput by passively watching the performance of those non-controlled operations.

It is recognized that access to more user information makes it possible to enhance these three types of tests. For example, the actions, behaviours, or locations of the users (or mobile services) could dictate which of the three types of tests to perform. These same actions, behaviours, or locations could also provide additional information which can inform the approach to testing or how the results should be interpreted to generate more valuable and accurate insights.

Traditionally, passive testing has been found to be less accurate than active testing. This is because less is known about the traffic being analyzed, that is, passive testing is less controlled. The system 18 described herein can be configured to perform network tests that are either initiated by user actions, or informed by user actions. This can be done by being given, or otherwise having access to, additional user or mobile service information, which can greatly enhance passive testing (and testing in general). This is because mobile apps 38 can track user actions such as the user clicking a button to upload a photo. When the mobile app 38 sees that a user has clicked the button "upload photo", it can run a passive network test on that data upload while knowing: 1) It was a photo; 2) the size of the photo being uploaded; and 3) the destination server address. In other words, the mobile app 38 and WDS 40 are in a position to leverage an increased understanding of the nature of the file transfer to perform a more effective and accurate passive throughput test. This can be done, for example, by having the WDS 40 utilize an API to ingest information from the mobile app 38. In this way, the mobile app 38 passes information to the WDS 40, such as "the user just clicked a button to upload a photo of size x". Accessing this information provides context that may not have previously been available for passive testing, for instance when a file has been uploaded, not knowing that it was a photo, the resolution or size of the photo, or the destination server and routing details.

The system 18 can therefore be adapted such that the user's interaction with a mobile service would dictate what type of passive network test to perform and how to interpret the results. For example, if the user uploads a photo on a particular mobile service such as Instagram, the system 18 can use that additional information to perform a passive network test that is designed to monitor the network's ability to handle photo uploads. This additional information can be provided by a mobile application 38 and is typically provided by the mobile application 38 which contains the network testing code—however other sources for that additional information are possible. In this event, the system's passive test would have access to additional information such as: 1) that the user is trying to upload a photo; 2) the size of that photo; and 3) the destination sever, etc.

It can be appreciated that user informed testing does not need to be limited to passive network tests. The mobile user's behaviour, characteristics, location, etc. could dictate specific active tests which should be run based on the types of tests desired by the controller of the system. User informed testing also allows the system to consider when an active test or a passive test would be most appropriate. For example, it may be best to only run passive tests, which don't create more new network traffic, when the user is watching a video or doing something with their device 12 which is sensitive to network performance. In other words this "additional information" and user informed testing can help dictate when and where tests should be performed to: 1) not interfere with user experience, or 2) provide the information which is most needed by the system.

Furthermore, as wireless networks move more and more towards being virtualized or software defined, the user informed test results can be used to modify or dictate the hardware, software or implementation of the network 14 itself by informing the network's requirements based on the services and applications 38 being used by users and the actions they take.

The system 18 described herein can therefore be used to perform user informed/dictated testing, that is, where the user does not specifically choose to run a network test. In this case, network tests are selected and initiated based on the actions performed by a user of a mobile device 12 which contains the network testing software (e.g., downloading a photo). The details of those actions performed by the user can be used as an input into the analysis of the results (e.g., a network's ability to serve a photo). The action performed by the user is something that is not the user choosing to run a network test.

It can be appreciated that while the above examples are in the context of knowing more about a user, and the in-app buttons such a user would select, it could equally be a non-human service that provides the additional information.

Device Churn Tracking & Advertising

The above-described systems and methods contemplate tracking mobile devices 12 as they access and make user of wireless networks 14. These mobile devices 12 and their users can be identified and tracked on a day-to-day basis in various ways, including:

a) The mobile device ID: For example MAC Address, IMEI, or IMSI of the mobile device.

b) The advertising ID of the device: Advertiser ID or IDFA are non-persistent ID's of the mobile device 12 used to serve targeted mobile advertisements.

c) Cookies: IDs that are installed on devices as they access and use networks and network services.

d) The mobile software ID (or WDS ID): A unique ID generated by mobile device software to identify a specific installation of the software.

e) An ID used to log-in to mobile software: For example, a Facebook ID, Netflix ID or Gmail ID that is used by a user to log-in to a mobile application 38.

f) A set of behaviour characteristics: For example, a set of characteristics, which may be defined based on a number of factors which may include locations of the device, IP addresses used by the device, or WiFi/Cellular access points generally used by the user.

Each device tracking approach has its own privacy implications which typically needs to be considered and managed. That is, a selected tracking approach would normally need to be both acceptable to the mobile device user and certain legal requirements.

By tracking how these IDs flow through networks 14, the system 18 may be used to inform wireless service providers about user churn. For example, if an application ID is used to log-in on a phone on a first network 14a one day, and then later the same application ID is used to log-in on a phone on a second network 14b, then it can be reported that this user likely churned. That is, in this case it can be expected that this user left the first network 14a and became a customer on the second network 14b. Such churn reporting on its own provides a valuable service to wireless providers. However, this reporting becomes even more powerful when combined with other data sets to enable predictive capabilities which create the possibility of advertising to influence churn.

For example, this historical network churn information when combined with other information sets such as wireless network coverage, wireless network performance, website cookies, recent searches, mobile device hardware/software, user network subscription plans, what people are saying about the wireless network operator on social media, and other information sets, can be used to perform churn prediction on individual users or on large aggregate portions of the population.

This enables enhanced targeted advertising by wireless operators to users who are either: 1) high probability candidates to leave their network 14; or 2) high probability candidates to leave their competitor's networks 14. The same mobile IDs can be used to target specific users or IDs with appropriate advertisements.

As an example, the system's wireless network performance tests can be used to compare networks and inform targeted advertising campaigns. If the second network provider discovers that they are the best wireless network in a specific city they could adjust their advertising to devices in that city to promote their network as being the highest performer. It is then possible for mobile applications 38 and services to suggest wireless operators to their users. Users may opt-in to allow a wireless service, such as Facebook, to track network performance, their usage patterns, and location and then suggest to them the best wireless network 14 for their requirements.

As an alternative approach to tracking user churn, the system 18 may track which groupings of mobile devices 12 tend to show up on specific networks 14. For example, if the same four mobile devices consistently access the same WiFi access point, or access networks via the same IP address, it is reasonable to assume that this is a family unit or associated group. If suddenly one of those devices 12 leaves that grouping and a new device 12 appears which is authenticated with a different cellular wireless network 14 it can be reasonably assumed that there has been a network churn event by the user of that newly appearing device.

As such, tracking one or more IDs associated with a user or device 12, and obtaining access to or otherwise tracking user-related events such as social media posts, can enhance churn identification and churn reporting and/or targeted advertising. The system 18 can be adapted for such churn prediction by tracking a user as they move across networks 14 and across mobile devices 12 using their social media log-in IDs, such that an analysis of network/device churn can be performed.

Net Neutrality and Service Level Agreement Tracking

Wireless network performance tracking by the system 18, which can be performed by crowdsourcing from mobile end points as described above, can also be used to determine which areas, users, or services are being throttled; as well as which areas, users or services are being provided with enhanced levels of service.

Identifying and comparing low performance and high performance cases can be used in a variety of ways, for example:

a) To inform cities and governments on which areas are being properly served by wireless service providers. Wireless regulators often require that carriers provide certain levels of service to rural areas and/or less privileged neighborhoods, and violators can be identified and penalized using the testing data.

b) To inform Mobile Virtual Network Operators (MVNOs) on whether or not a home network is providing adequate levels of service or if the home network operator is providing inferior service to the MVNO's subscribers compared to their own. This allows the MVNO to determine if their home operator is in violation service level agreement (SLA) rules.

c) To inform wireless networks 14 on which network 14 they should have their subscribers roam to and whether or not those roaming networks 14 are adhering to or violating SLAs and how the roaming quality experience by their roaming subscribers compares to the quality being received by that network home subscribers.

d) Whether or not net neutrality laws are being adhered to or violated. For example, it can be seen if a network operator is throttling a third party streaming service, and promoting their own streaming service, and to what extent.

The system 18 can therefore be adapted such that the network test results or service quality is compared against a threshold of quality dictated by a wireless regulator or home network provider to see if requirements are met.

Event Driven Testing—Self-Driving Vehicles/Cyber-Physical

Network quality and coverage is often considered critical to certain emerging cyber-physical domains such as self-driving vehicles and ehealth. In these cases, the end mobile device 12 has a core purpose, which is network sensitive. It is important that these devices 12 maintain access to network quality that is good enough to meet their core purpose requirements. For example, an ehealth device designed to inform hospitals of heart attacks should be able to send a message to hospitals or emergency dispatchers when a heart attack is detected.

Network testing capabilities for these devices 12 may then be considered critical to their performance, with test being triggered by events which are inherent to the device's core purpose.

In one example, a self-driving vehicle or vehicle network may choose to run tests whenever vehicles need to perform emergency maneuvers (e.g., avoid an animal or other obstruction on the road) to track the performance of these maneuvers. Alternatively, the vehicle grouping may run tests only in cases when it is known that there are portions of the road or route where network performance information is lacking. In these cases a network testing system can have its tests triggered by external events. The resulting network dataset can be combined with information about the cyber-physical device's operation and requirements to determine if the network 14 is adequate for that cyber-physical device's requirements.

In another example, an e-health device 12 may perform event driven tests on the network 14 to ensure that the network 14 is performing well enough to handle the network requirements of an emergency situation (and that the devices is connected to the appropriate server). Example events in this case may be: 1) User is sleeping or user is in nor immediate health danger; 2) User health reading are reaching dangerous levels which could get worse; 3) User is in danger.

It can be appreciated that in applications such as self-driving vehicles the devices 12 are in a great position to map network quality across huge areas and therefore may be relied upon or otherwise play an increased role in future network testing. It can also be appreciated that vehicles are not just limited to automobiles, and may include drones or other autonomous devices.

Privacy in Mobile Device Testing

The mobile devices 12 used to perform network testing typically need to have the ability to preserve user privacy to degrees that are informed by the user themselves. For example, if a user inputs that they either opt-in or opt-out of the service, or portions of the service, the overall system should be responsive to that input and adjust what is collected accordingly. The analysis and handling of that data should also be informed by those same user inputs.

The system 18 can also be adapted to ensure that it is capable of consuming information about the jurisdictional and geographic difference in privacy rules and be responsive to those rules. For example, a global testing system may perform differently in Russia than in the European Union depending on the current governing privacy legislation in both areas.

It can also be important that the system 18 orchestrate the tests performed amongst the full network of testing end points to preserve privacy of users. For example, the system 18 may choose to distribute the tests amongst the mobile devices 12 in such a way that makes it even more difficult to track the movement or characteristics of a specific device 12. Or, for example, if a specific area is known to be private property and have a very low population density, the system 18 can be configured to be able to handle that data differently, or not collect data from that area, since it would be easier than normal to associate the tests taken in that low-population area with the person or persons known to live in or access that area. There may also be specific geographic areas in which it becomes illegal to run tests or measure location, and the system 18 may need to be adapted accordingly.

MIMO/SON—Interference Suppression and Beam Forming

Multi-input Multi-output (MIMO) and SON systems 22b may have a multiplicity of channels available, each of which is evaluated. Also, MIMO and SON systems 22b can use beamforming to broadcast specific channels and network resources to specific mobile devices 12, namely based on their unique requirements. As a result each user in the network 14 can be experiencing something completely different such that the importance of crowdsourcing network quality increases.

Information crowdsourced from the mobile devices 12 themselves can ultimately be used to inform the network 14 about the network characteristics which are required to be broadcasted to each mobile device 12 and how this beamforming needs to take place (generally based on the application being used or subscription tier of the user). As the waveforming and beamforming takes place, the mobile device's application and network experience information (crowdsourced via the system 18) can be used in a feedback loop to inform the waveforming and beamforming processes.

In other words, beamforming allows every user to get access to different network characteristics. However in order to understand if this is working well, there needs to be a feedback loop informed by network crowdsourcing as herein described.

Security

Abnormal Mobile Device Behavior: The network testing/monitoring agent (e.g. the WDS 40) can be used to detect/identify compromised mobile devices 12. For example, if the WDS 40 normally sees that a mobile device 12, or an IoT device 12, normally only uses 2 MB/day of data, and then that suddenly jumps to 100 MB, the system 18 can be used to identify this abnormal network behaviour and flag the device 12 as possibility being compromised.

Abnormal Access Point Behavior: It is recognized that adversaries are beginning to use rogue access points and fake cell towers to lure mobile devices 12 into connecting. They can then monitor the traffic over the network 14 or use these malicious connections to install malware. The system 18 can also be used to identify abnormal access point behaviours. For example, if users are accessing the same access point from various locations, then that access point may be a rogue access point which is being driven around luring connections. Alternatively, if the cell tower ID, or some other identifier of a cell tower, or a cell tower's characteristics suddenly change, it can be flagged as possibly being a false tower made to appear similar to the non-malicious access point.

The system 18 can therefore be adapted such that the performance and details of mobile devices 12 and network access points are compared against the expected details/performance to search for network issues and compromised systems.

Leaking of Private Network: Certain networks are not intended to be seen outside of specific geographic areas and certain facilities. The system 18 can report if certain networks 14 are seen where they should not be seen.

Additional features which can make the system 18 more secure include:

a) The network of mobile devices 12 can be controlled by several network controllers instead of just one (i.e. system fragmentation). For example, the mobile devices 12 can use a different configuration server 24. It can be appreciated that there may also be benefits in fragmentation, which would require subset populations of devices 12 to use all different servers (i.e. different testing servers 120, different authentication servers 122, and different configuration servers 24). This way if one of the controllers is compromised then the whole system 18 is not compromised at once. In the scope of the above principles, the network controllers are generally used to control which devices 12 run which tests and under what conditions. The network controllers are also used to control which servers are used for those tests. If those servers are compromised, then the entire system could be used to run a DDOS attack.

b) The mobile device agents (e.g., WDS 40) which perform the tests can be setup so that they re-authenticate every so often or they otherwise go dormant. This characteristic can be hardcoded into the WDS 40 so that if the WDS 40 becomes compromised (e.g., to run a DDOS attack) then after a certain period of time the WDS 40 shuts off because it stops being able to re-authenticate.

Example Use Cases

Application Monitoring: The network tests described above can be used to report the performance or likely performance of network applications 38 such as Skype, YouTube, Netflix, etc. without ever interacting directly with the proprietary servers used by those applications. Instead, the network requirements of those applications 38 are understood and compared against the network characteristics being observed and collected by the network testing agent (e.g., WDS 40) in order to report on application performance. The system 18 can therefore be configured such that the results are used to report the performance or likely performance of network applications 38.

Network Operations: The above-described crowdsourcing can provide alarms to network operators indicating specific areas or network access points which are providing less than optimal performance. These alarms and this information can be used to inform network maintenance or indicate which areas of a network 14 require additional testing by other methods. The system 18 can therefore be configured such that the performance and details of mobile devices 12 and network access points are compared against the expected details/performance to search for network issues and compromised systems.

Network Planning: The system 18 can pinpoint areas with large foot traffic or population densities that are also underserved by wireless service providers. These are the areas where network improvements are expected to provide the largest gains to the overall subscriber base. By comparing this performance to that of competitors, the system 18 can suggest areas where the network operator should focus to be more competitive and perform better customer acquisition. The system 18 can therefore be configured such that the results are used in conjunction with user density information collected from the system 18 or external sources to inform a network operator on the most beneficial location for network maintenance, expansions, and upgrades.

Competitor Tracking: The system 18 can be used to inform a network operator on: 1) what new towers or technologies are being implemented by competitors; 2) which network operators are gaining the most subscribers and where; 3) what types of applications/services the competitive network are running and how that is changing over time; and 4) the performance of competitive networks and how that is evolving over time. The system 18 can therefore be configured such that the results are used to inform a wireless operator on the performance being delivered by their competitors to their competitor's subscribers and in which the new network implementation/alternations of competitors are recorded, predicted, and reported.

Connection Management Platform Interaction

Furthermore, the system 18 can also be configured to interact with a device connection management platform (not shown), as my be provided by a mobile phone operating system, or as may be controlled by the network operator, to help a mobile device 12 select an appropriate network 14 or access point connection. In this case the data collected by the WDS 40 is transmitted, either in its raw form or after an analysis of the data, to the connection management platform via an API for use in the network or access point selection process.

Artificial Intelligence and Machine Learning

Furthermore, the system can also benefit from the use of Artificial Intelligence (AI) and Machine Learning (ML) in addition to data analysis. Data reported by the WDS 40 may be input to AI and ML platforms (not shown) for processing into enhanced information to be used by network operators for purposes such as network planning, network maintenance, customer care, customer advertising, and operators. In addition, this enhanced information may be input to SON, software defined network (SDN), network function virtualization (NFV), or MIMO systems such that the network 14 can be responsive to this enhanced information produced by AI and ML processes run on the data supplied by the WDS 40. Groups other than network operators may similarly benefit from the enhanced information produced by AI and ML applied to the WDS test data.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the system 18, any component of or related to the system 18, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A computer-implemented method of evaluating user churn in wireless networks, the method comprising:
    having embedded in an application or memory, in each of a plurality of electronic devices, wireless device software configured to collect the data when the plurality of wireless electronic devices access one or more of a plurality of wireless networks and/or network types, the wireless device software enabling crowdsourcing data from the plurality of electronic devices;
    receiving data from the respective embedded wireless device software of the plurality of wireless electronic devices connected to and operating in the plurality wireless networks and/or network types,
        wherein the data comprises one or more identifiers associated with the plurality of wireless electronic devices or users of the wireless electronic devices;
    aggregating the data received from the plurality of wireless electronic devices;
    analyzing the aggregated data to determine how at least one of the identifiers flow through the plurality of networks, devices, and/or network types; and
    outputting a prediction or indication of user network churn or user device churn or user network acquisitions or user device acquisitions based on which networks, devices, and/or network types the users or wireless electronic devices access.

2. The method of claim 1, further comprising:
collecting network and device churn information over time to establish historical data associated with network and device churn; and
using the historical data to perform a churn prediction for an individual user or an aggregate portion of a population of users.

3. The method of claim 2, further comprising:
generating a targeted message for the individual user or population of users; and
sending the targeted message to devices for the individual user or population of users to influence joining or leaving a particular network provider.

4. The method of claim 3, wherein the targeted message comprises an advertisement.

5. The method of claim 1, further comprising:
enabling the users of the wireless electronic devices to opt in to having a wireless service track network performance, usage patterns and/or location, and receive a suggestion for a wireless network or wireless device for their requirements based on the tracking.

6. The method of claim 1, wherein the one or more identifiers comprises a mobile device identifier (ID), an advertising ID, IP address, a cookie, a mobile software ID, an ID to log-in to mobile software, or an ID providing a set of behavior characteristics.

7. The method of claim 1, wherein the wireless device software operates to manage one or more privacy settings that are accepted by the user and/or maintain one or more legal requirements.

8. The method of claim 2, wherein the historical information is combined with at least one other information set, wherein the at least one other information set comprises wireless network coverage, wireless network performance, cookies, recent searches, mobile device hardware or software, user network subscription plans, promotions or cost details of plans or devices, comments on a wireless network operator made on social media, or other historical information collected from a different population of users or devices.

9. The method of claim 1, wherein the aggregated data is analyzed to compare networks and inform a targeted advertising campaign.

10. The method of claim 1, wherein the aggregated data is analyzed to evaluate the plurality of networks, wherein the evaluating comprises identifying abnormal access point behaviors or malicious network connections.

11. A system for evaluating user churn in wireless networks, the system comprising a processor and memory, the memory computer executable instructions that when executed by the processor operate the system to:
have embedded in an application or memory, in each of a plurality of electronic devices, wireless device software configured to collect the data when the plurality of wireless electronic devices access one or more of a plurality of wireless networks and/or network types, the wireless device software enabling crowdsourcing data from the plurality of electronic devices;
receive data from the respective embedded wireless device software of the plurality of wireless electronic devices connected to and operating in the plurality wireless networks and/or network types,
wherein the data comprises one or more identifiers associated with the plurality of wireless electronic devices or users of the wireless electronic devices;
aggregate the data received from the plurality of wireless electronic devices;
analyze the aggregated data to determine how at least one of the identifiers flow through the plurality of networks, devices, and/or network types; and
output a prediction or indication of user network churn or user device churn or user network acquisitions or user device acquisitions based on which networks, devices, and/or network types the users or wireless electronic devices access.

12. The system of claim 11, further configured to:
collect network and device churn information over time to establish historical data associated with network and device churn; and
use the historical data to perform a churn prediction for an individual user or an aggregate portion of a population of users.

13. The system of claim 12, further configured to:
generate a targeted message for the individual user or population of users; and
send the targeted message to devices for the individual user or population of users to influence joining or leaving a particular network provider.

14. The system of claim 13, wherein the targeted message comprises an advertisement.

15. The system of claim 11, further configured to:
enable the users of the wireless electronic devices to opt in to having a wireless service track network performance, usage patterns and/or location, and receive a suggestion for a wireless network or wireless device for their requirements based on the tracking.

16. The system of claim 11, wherein the one or more identifiers comprises a mobile device identifier (ID), an advertising ID, IP address, a cookie, a mobile software ID, an ID to log-in to mobile software, or an ID providing a set of behavior characteristics.

17. The system of claim 11, wherein the wireless device software operates to manage one or more privacy settings that are accepted by the user and/or maintain one or more legal requirements.

18. The system of claim 12, wherein the historical information is combined with at least one other information set, wherein the at least one other information set comprises wireless network coverage, wireless network performance, cookies, recent searches, mobile device hardware or software, user network subscription plans, promotions or cost details of plans or devices, comments on a wireless network operator made on social media, or other historical information collected from a different population of users or devices.

19. The system of claim 11, wherein the aggregated data is analyzed to compare networks and inform a targeted advertising campaign.

20. The system of claim 11, wherein the aggregated data is analyzed to evaluate the plurality of networks, wherein the evaluating comprises identifying abnormal access point behaviors or malicious network connections.

21. A non-transitory computer readable medium comprising computer executable instructions for evaluating user churn in wireless networks, comprising instructions for:
having embedded in an application or memory, in each of a plurality of electronic devices, wireless device software configured to collect the data when the plurality of wireless electronic devices access one or more of a plurality of wireless networks and/or network types, the wireless device software enabling crowdsourcing data from the plurality of electronic devices;

receiving data from the respective embedded wireless device software of the plurality of wireless electronic devices connected to and operating in the plurality wireless networks and/or network types,
  wherein the data comprises one or more identifiers associated with the plurality of wireless electronic devices or users of the wireless electronic devices;
aggregating the data received from the plurality of wireless electronic devices;
analyzing the aggregated data to determine how at least one of the identifiers flow through the plurality of networks, devices, and/or network types; and
outputting a prediction or indication of user network churn or user device churn or user network acquisitions or user device acquisitions based on which networks, devices, and/or network types the users or wireless electronic devices access.

* * * * *